(12) United States Patent
Pierce

(10) Patent No.: US 6,643,337 B1
(45) Date of Patent: Nov. 4, 2003

(54) CODIFFERENCE CORRELATOR FOR IMPULSIVE SIGNALS AND NOISE

(75) Inventor: Robert D. Pierce, Sterling, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 698 days.

(21) Appl. No.: 09/587,366

(22) Filed: Jun. 2, 2000

(51) Int. Cl.⁷ .............................................. H04L 13/18
(52) U.S. Cl. ........................ 375/343; 342/189; 342/378; 708/422
(58) Field of Search ................................. 375/142, 150, 375/343; 708/422, 426; 342/22, 189, 378, 384; 340/850

(56) References Cited

U.S. PATENT DOCUMENTS

| | | |
|---|---|---|
| 4,070,652 A | 1/1978 | Heng et al. |
| 4,112,497 A | 9/1978 | Layland et al. |
| 4,117,480 A | 9/1978 | Boario |
| 4,234,883 A | 11/1980 | Kaelin et al. |
| 4,355,368 A | 10/1982 | Zeidler et al. |
| 4,826,285 A | 5/1989 | Horner |
| 4,860,239 A | 8/1989 | Baron |
| 5,365,549 A | 11/1994 | Kazecki |
| 5,787,128 A | 7/1998 | Honkisz |
| 5,982,810 A | 11/1999 | Nishimori |
| 6,084,862 A * | 7/2000 | Bjork et al. ................. 370/292 |
| 6,272,186 B1 * | 8/2001 | Bontu et al. ................. 375/340 |

OTHER PUBLICATIONS

David J. McLaughlin, Nicholas Allan, Elizabeth M. Twarog, D.B. Trizna, "High Resolution Polarimetric Radar Scattering Measurements of Low Grazing Angle Sea Clutter," *IEEE Journal of Oceanic Engineering*, vol. 20, No. 3, Jul. 1995, pp 166–178.

Peter D. Welch, "The Use of Fast Fourier Transform for the Estimation of Power Spectra: A Method Based on Time Averaging Over Short, Modified Periodograms," pp 335–338, Reprinted from *IEEE Trans. Audio Electroacoust.*, vol. AU–15, Jun. 1967, pp 70–73.

Robert D. Pierce, "RCS Characterization Using the Alpha–Stable Distribution," Presented at the IEEE 1996 National Radar Conference, Ann Arbor, Michigan, May 13–16, 1996, pp 154–159 and proceedings title page (p i).

Robert D. Pierce, "Inconsistencies in Parameters Estimated from Impulsive Noise," *Current Topics in Nonstationary Analysis*, Proceedings of the Second Workshop on Nonstationary Random Processes and Their Applications, San Diego, California, Jun. 11–12, 1995, edited by George Trevino et al., World Scientific, River Edge, New Jersey, 1996, pp 15–33 and book title page.

* cited by examiner

Primary Examiner—Amanda T. Le
(74) Attorney, Agent, or Firm—Howard Kaiser

(57) ABSTRACT

A complex signal correlator such as can be implemented in a correlation detector system affords a unique algorithm which estimates the codifference correlation between two complex signals based on the sum and difference of codifference estimates, each codifference estimate having equivalently associated therewith a dispersion estimate. Typical embodiments provide a receiving antenna and a receiver inclusive of the codifference correlator, wherein radio frequency waves are down converted and sampled, the sampled signals are correlated with a reference signal contained in a memory, and the resultant correlation signal is detected and transduced. The inventive correlator is based on an alpha-stable distribution and, in comparison with conventional alpha-stable distribution-based correlators, can more effectively operate in a realm wherein alpha is less than one.

23 Claims, 12 Drawing Sheets

CODIFFERENCE CORRELATOR FOR IMPULSIVE SIGNALS AND NOISE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to methods and apparatuses for correlating or establishing a statistical correlation of plural random variables, more particularly to methods and apparatuses for doing same in relation to physical phenomena such as impulsive signals or noise.

The alpha-stable distribution is an important area for investigation. One reason for the importance of the alpha-stable distribution is that it models impulsive noise. Another reason is that this statistical distribution is expected from superposition in natural processes. The parameter alpha, $\alpha$, is the characteristic exponent that varies over $0<\alpha\leq 2$. The alpha-stable distribution includes the Gaussian when $\alpha=2$. For $\alpha$ less than two, the distribution becomes more impulsive, more non-Gaussian in nature, and the tails of the distribution become thicker. This makes the alpha-stable distribution an attractive choice for modeling signals and noise having an impulsive nature. Also, from the generalized central limit theorem, the stable distribution is the only limiting distribution for sums of independent and identically distributed (IID) random variables (stability propert). If the individual distributions have finite variance, then the limiting distribution is Gaussian. For a less than two, the individual distributions have infinite variance. For detailed information, see the following two books, each of which is hereby incorporated herein by reference: C. L. Nikias and M. Shao, Signal Processing with Alpha-Stable Distributions and Applications, John Wiley and Sons, New York, N.Y., 1995; G. Samorodnitsky and M. S. Taqqu, Stable Non-Gaussian Random Processes: Stochastic Models with Infinite Variance, Chapman and Hall, New York, N.Y., 1994.

Sources that could follow or be modeled by the alpha-stable distribution are abundant and include lightning in the atmosphere, switching transients in power lines, static in telephone lines, seismic activity, climatology and weather, ocean wave variability, surface texture, the slamming of a ship hull in a seaway, acoustic emissions from cracks growing in engineering materials under stress, magnetic avalanche or Barkhausen noise, transition boundary layer flow, etc. Many sources can exist in the area of target and background signatures that affect detection and classification. In underwater acoustics, examples of these sources could include interference to target detection such as ice cracking, biologics, bottom and sea clutter in active sonar, ocean waves near the surface and in the surf zone. They could also include target characteristics such as target strength in active sonar and cavitation. Similar sources in radar and infrared can include: ocean waves in the form of sea clutter and radar cross section (RCS); see R. D. Pierce, "RCS Characterization using the alpha-stable distribution," Proc. 1996 IEEE National Radar Conference, Ann Arbor, Mich., May, 13–16, 1996, pp 154–159, hereby incorporated herein by reference. A 10 second long example of spiky, horizontally polarized (H-pol), radar sea clutter is shown herein in FIG. 1.

Two known and limitedly successful methodologies of establishing a statistical correlation, based on the alpha-stable distribution, are classical second-order correlation and covariation correlation. Neither second-order correlators nor covariation correlators have proven capable of obtaining consistent estimates of the relationship between two channels of noise characterized by impulsiveness. Furthermore, second-order correlators operate in a realm wherein alpha is equal to two. Covariation correlators operate in a realm wherein alpha is greater than or equal to one and less than or equal to two. Hence, when alpha is less than one (as would generally be the case, for instance, when the noise is extremely spikey, even more than the noise illustrated in FIG. 1), neither second-order correlators nor covariation correlators work to provide consistent results.

Of interest and incorporated herein by reference are the following United States patents: Nishimori U.S. Pat. No. 5,982,810 issued Nov. 9, 1999; Honkisz U.S. Pat. No. 5,787,128 issued Jul. 28, 1998; Kazecki U.S. Pat. No. 5,365,549 issued Nov. 15, 1994; Baron U.S. Pat. No. 4,860,239 issued Aug. 22, 1989; Horner U.S. Pat. No. 4,826,285 issued May 2, 1989; Zeidler et al. U.S. Pat. No. 4,355,368 issued Oct. 19, 1982Kaelin al. U.S. Pat. No. 4,234,883 issued Nov. 18, 1980; Baario U.S. Pat. No. 4,117,480 issued Sep. 26, 1978; Fletcher et al. U.S. Pat. No. 4,112,497 issued Sep. 05, 1978; Heng et al. U.S. Pat. No. 4,070,652 issued Jan. 24, 1978.

SUMMARY OF THE INVENTION

In view of the foregoing, it is an object of the present invention to provide an alpha-stable distribution based correlator which can reliably estimate the relationship between two channels of impulsive noise.

It is a further object of the present invention to provide an alpha-stable distribution-based correlator which can operate in a realm wherein alpha is less than one.

The present invention provides a methodology for correlating at least two remotely and/or locally generated signals, e.g., quantifying a relationship therebetween. An inventive method is provided for producing an output signal which is indicative of a correlation of at least two input signals. The inventive method comprises calculating (i.e., estimating) the codifference correlation with respect to at least two input signals, and producing an output signal commensurate with the codifference correlation. The estimating includes considering the sum and difference of codifference estimates wherein each codifference estimate is equated with a corresponding dispersion estimate. According to typical inventive practice, the calculating includes treating each signal as a complex signal representative of real and imaginary terms characterized by values and defined by real and imaginary axes.

Further provided according to this invention is a correlator for correlating a reference signal and a sampler signal. The inventive correlator admits of implementation in a communication system of the type including antenna means for receiving electromagnetic waves, down converter means for down converting a modulated signal received from the antenna, means, sampler means for sampling a down converted. signal received from the down converted means, and memory means for storing a reference signal. The inventive correlator correlates the reference signal (received from the memory means) and the sampler signal (received from the sampling means). The inventive correlator comprises algorithmic means for calculating (i.e., estimating) the codifference correlation based on the sum and difference of codifference estimates, wherein each codifference estimate is equated with a corresponding dispersion estimate.

This invention further provides a correlation detection system for use in association with a modulated signal such as produced by an antenna receiving electromagnetic waves such as radio frequency waves. The inventive correlation detection system comprises a down converter, a sampler, a memory and a correlator. The down converter is adaptable to down converting the modulated signal and producing a down converted signal. The sampler is adaptable to sampling the down converted signal and producing a sampled signal. The memory is adaptable to storing a reference signal. The correlator is adaptable to correlating the reference signal and the sampled signal. The correlator includes processor means and is capable of calculating (i.e., estimating) the, codifference correlation between the reference signal and the sampled signal, based on the sum and difference of codifference estimates. Each codifference estimate is taken from equation with a corresponding dispersion estimate.

In accordance with the present invention, the measure of a normalized codifference correlation can be indicated as h. An overall estimate h of the normalized codifference correlation between two signals x' and y' is found by the following equation, wherein h is equated to a quotient expression which takes the sum and difference of various codifference estimates:

$$\hat{h} = [(\hat{\tau}_{x'_R,-y'_R} - \hat{\tau}_{x'_R,y'_R} + \hat{\tau}_{x'_I,-y'_I} - \hat{\tau}_{x'_I,y'_I}) +$$

$$i(\hat{\tau}_{x'_R,-y'_I} - \hat{\tau}_{x'_R,y'_I} - (\hat{\tau}_{x'_I,-y'_R} - \hat{\tau}_{x'_I,y'_R}))]/(2^\alpha \hat{\gamma}_{x'})$$

The codifference estimates are each formed from its corresponding dispersion estimate, as follows:

$$\hat{\tau}_{x'_R,-y'_R} = \hat{\gamma}_{x'_R} + \hat{\gamma}_{y'_R} - \hat{\gamma}_{x'_R+y'_R}$$

$$\hat{\tau}_{x'_R,y'_R} = \hat{\gamma}_{x'_R} + \hat{\gamma}_{y'_R} - \hat{\gamma}_{x'_R-y'_R}$$

$$\hat{\tau}_{x'_I,-y'_I} = \hat{\gamma}_{x'_I} + \hat{\gamma}_{y'_I} - \hat{\gamma}_{x'_I+y'_I}$$

$$\hat{\tau}_{x'_I,y'_I} = \hat{\gamma}_{x'_I} + \hat{\gamma}_{y'_I} - \hat{\gamma}_{x'_I-y'_I}$$

$$\hat{\tau}_{x'_R,-y'_I} = \hat{\gamma}_{x'_R} + \hat{\gamma}_{y'_I} - \hat{\gamma}_{x'_R+y'_I}$$

$$\hat{\tau}_{x'_R,y'_I} = \hat{\gamma}_{x'_R} + \hat{\gamma}_{y'_I} - \hat{\gamma}_{x'_R-y'_I}$$

$$\hat{\tau}_{x'_I,-y'_R} = \hat{\gamma}_{x'_I} + \hat{\gamma}_{y'_R} - \hat{\gamma}_{x'_I+y'_R}$$

$$\hat{\tau}_{x'_I,y'_R} = \hat{\gamma}_{x'_I} + \hat{\gamma}_{y'_R} - \hat{\gamma}_{x'_I-y'_R}$$

using the real and imaginary terms from the input (or first signal)

$$x' = x'_R + ix'_I = (x_R + n_R) + i(x_I + n_I)$$

and the real and imaginary terms from the output (or second signal)

$$y' = y'_R + iy'_I = (h_R x_R - h_I x_I + m_R) + i(h_I x_R + h_R x_I + m_I)$$

Using $x'_R$ as an example, each of the dispersions is estimated from the N data samples $$\hat{\gamma}_{x'_R} = (C(p, \alpha))^{-\alpha/p} \left( \frac{1}{N} \sum_{k=1}^{N} |x'_R(k)|^p \right)^{\alpha/p}$$

where $$C(p, \alpha) = 2^p \frac{\Gamma\left(\frac{p+1}{2}\right)\Gamma\left(1 - \frac{p}{\alpha}\right)}{\Gamma\left(\frac{1}{2}\right)\Gamma\left(1 - \frac{p}{2}\right)}$$

and $$-1 < p < \alpha$$

where p can be selected from this interval using a minimum error procedure for a given alpha, and where the normalizing term in the codifference correlator is given by $$\hat{\gamma}_{x'} = \hat{\gamma}_{x'_R} + \hat{\gamma}_{x'_I}.$$

Incorporated herein by reference is McLaughlin,. D. J., et al, "High Resolution Polarimetric Radar Scattering Measurements of Low Grazing Angle Sea Clutter," IEEE Journal of Oceanic Engineering, Vol. 20, No. 3, July 1995, pp 166–178. An illustrative application of the inventive unnormalized codifference correlator is represented by the calculation of the terms for the averaged Mueller matrix as shown in McLaughlin equation (8). The Mueller matrix is used to describe the polarimetric scattering behavior of a radar target. Here the four complex-valued terms from the polarization scattering matrix (McLaughlin equation (1b)) are taken a pair at a time, and temporally (time) or spatially averaged to cover all sixteen combinations. This operation utilizes the classical second-order correlator (unnormalized). When applied to radar, scattering from spiky sea clutter, the unnormalized codifference correlator in accordance with the present invention would be expected to give a more accurate and consistent measure of the terms for the Mueller matrix.

The unnormalized codifference correlator is given by $$\hat{q}_{x'y'} = (\hat{\tau}_{x'_R,-y'_R} - \hat{\tau}_{x'_R,y'_R} + \hat{\tau}_{x'_I,-y'_I} - \hat{\tau}_{x'_I,y'_I}) +$$

$$i(\hat{\tau}_{x'_R,-y'_I} - \hat{\tau}_{x'_R,y'_I} - (\hat{\tau}_{x'_I,-y'_R} - \hat{\tau}_{x'_I,y'_R}))$$

where $$x' = x'_R + ix'_I$$

$$y' = y'_R + iy'_I$$

And, when related to McLaughlin equation (8) by using, for example, the average $<S^*_{vh}S_{vv}>$, the averaged product is replaced by the unnormalized codifference correlator using the polarization scattering elements where $$x' = S_{vv}$$

$$y' = S_{vh}$$

For symmetric alpha-stable (SαS) random variables with any characteristic exponent, alpha, from zero to two, the codifference is a measure of bivariate dependence. Signals and noise with this statistical distribution are impulsive in nature and classical correlation methods can give inconsistent answers. In accordance with the present invention, the properties of the codifference are exploited to construct a codifference correlator that can be used for estimating or quantifying the relationship between two complex, isotropic SαS random variables.

The traditional covariation correlator only works for alpha from one to two. The traditional classical correlator uses covariance (correlation coefficients and transfer functions)

which, for SαS signal and noise, is only defined for alpha of two. The present invention's codifference correlator functions in a manner somewhat comparable to the covariation correlator and the classical correlator.

Besides including alpha from zero to two, a major advantage of the inventive codifference correlator is robustness to uncorrelated SαS noise added to both random variables. A disadvantage of the inventive codifference correlator is a nonlinear relationship or bias with respect to the "amount of dependence," especially for alpha less than one. Potential applications of the present invention can range from characterizing small radar targets in spiky sea, clutter (e.g., as illustrated in FIG. 1) to the possible estimation of boundary layer velocity and pressure relationships in transitional flow.

Under real world circumstances in which a common signal along with uncorrelated, additive noise having an impulsive character is present in each channel prior to measurement, the inventive codifference correlator is capable of obtaining a consistent estimate of the relationship or common signal between the two channels. Known methodologies (e.g., second-order correlators and covariation correlators) cannot provide consistent estimates of this relationship. The present invention's codifference correlator will also work when the noise is extremely spiky (alpha less than one), and the known methodologies are not defined.

Other objects, advantages and features of this invention will become apparent from the following detailed description of the invention when considered in conjunction with the accompanying, drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 6 is a graphical representation of normalized random error for each correlator for a range of alpha.

DETAILED DESCRIPTION OF THE INVENTION

CONVENTIONAL CORRELATORS

Description of the two aforenoted conventional correlators, viz., the second-order correlator and the covariation correlator, is an appropriate point of departure for description of the codifference correlator in accordance with the present invention.

Classical Second-order Correlator (Covariance)

The theory of second-order moments is the basis for the classical correlator that involves variance, covariance and the power spectrum. Over the past 50 years, this theory has been the foundation of statistical signal modeling and processing. These methods require signals and noise with a finite variance. The Gaussian assumption is generally made which usually leads to analytically tractable results. For SαS signals and noise, the second moment or variance is infinite and applying second-order moments can result in inconsistent, nonrobust results. The least-squares criterion minimizes the second-order moment of estimation errors and even a small proportion of extreme observations in the data can result in large variations in the results.

Figure 1:
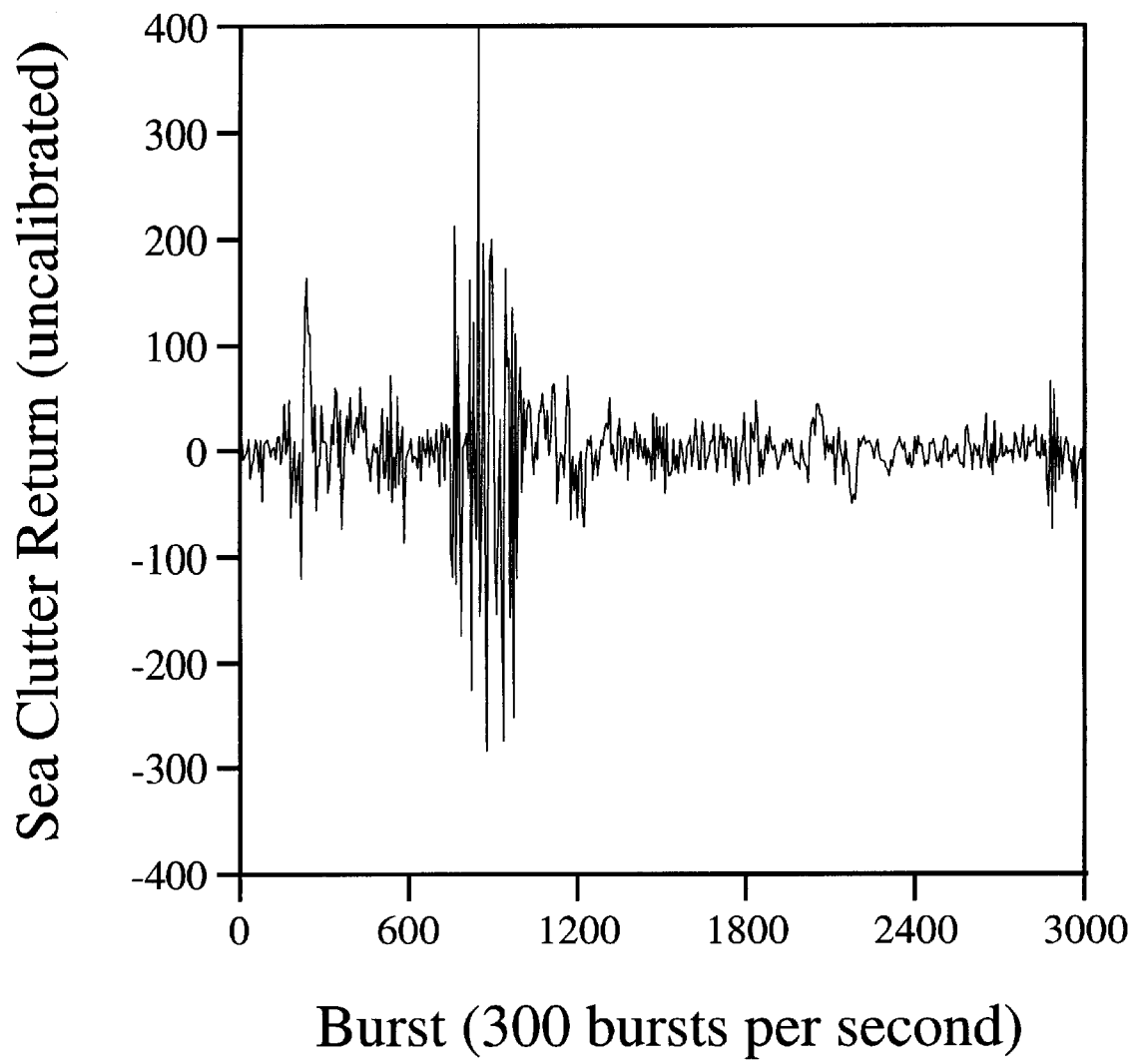
FIG. 1 is a graphical representation of spiky, H-pol sea clutter (alpha, α=1.3).
Figure 2:
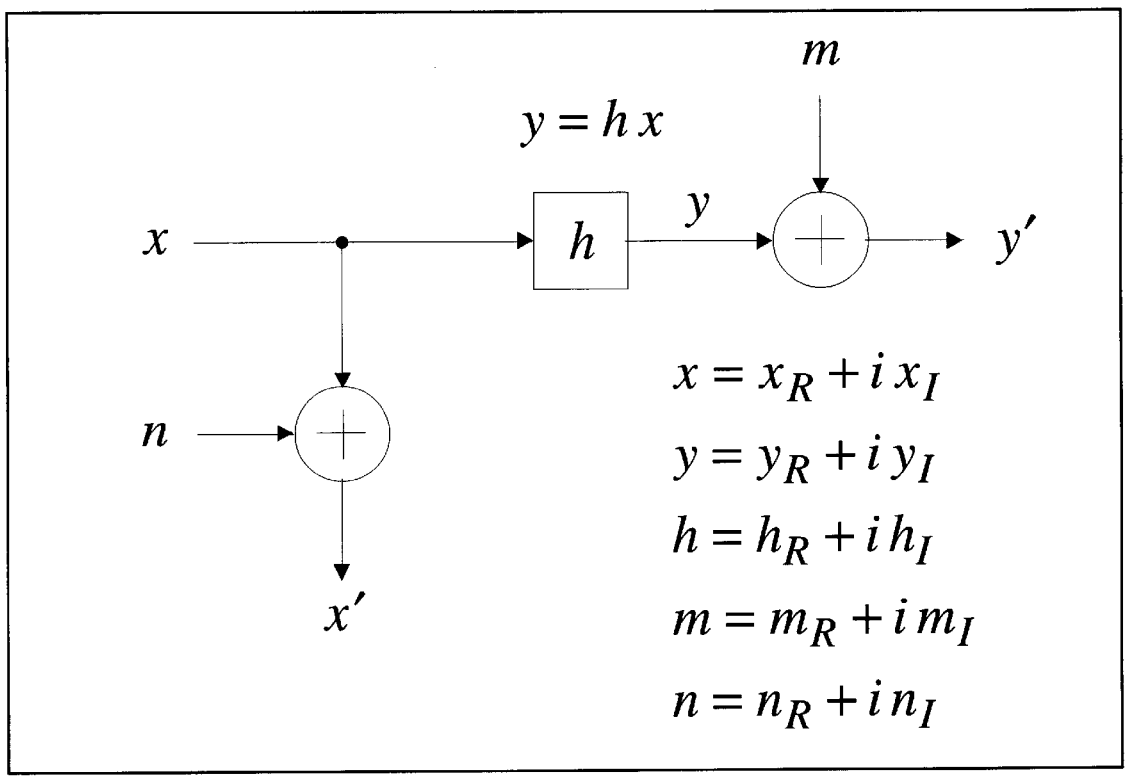
FIG. 2 is a diagrammatic representation of an additive measurement noise model.

Using second-order moments, the fundamental measure of bivariate dependence is correlation. With reference to FIG. 2, consider the additive measurement noise model in FIG. 2 where the relationship between x and y is the complex multiplication, y=hx, where the additive noises, n and m, are statistically independent of each other and the input, x, where $i=\sqrt{-1}$ and where N samples of x and y are available. For this basic building block, the objective is to quantify the degree of dependence by estimating h. Using cross correlation, h is estimated by the classical second-order correlator.

$$\hat{h} = \frac{1/N \sum_{k=1}^{N} y'_k x'^*_k}{1/N \sum_{k=1}^{N} x'_k x'^*_k} \tag{2.1}$$

where * indicates the complex conjugate, and $$\frac{E[y'x'^*]}{E[x'x'^*]} = h \frac{\sigma_x^2}{\sigma_x^2 + \sigma_n^2} \tag{2.2}$$

where $\sigma_x^2$ is the variance of x, and $\sigma_n^2$ is the variance of the additive noise on the input. The disadvantage of this method is that it is undefined for SαS signals and noise with α<2. From sampling studies, presented hereinbelow, the classical correlator is seen to give inconsistent results that become more severe as alpha becomes smaller and as measurement noise, n, is added to the input.

Covariation Correlator

For SαS signals and noise and for $1 \leq \alpha \leq 2$, the covariation correlator can perform a similar function to the classical correlator in second-order random variables. Using covariation, h is estimated by the covariation correlator $$\hat{h} = \frac{1/N \sum_{k=1}^{N} y'_k x'^*_k |x'_k|^{p-2}}{1/N \sum_{k=1}^{N} |x'_k|^p} \tag{2.3}$$

where $$\frac{E[y'x'^*|x'|^{p-2}]}{E[|x'|^p]} = h \frac{\gamma_x}{\gamma_x + \gamma_n} \tag{2.4}$$

where $p<\alpha$, and $\gamma_x$ and $\gamma_n$ are the dispersion of x and the additive noise on the input. See aforementioned C. L. Nikias and M. Shao, Signal Processing with Alpha-Stable Distributions and Applications, John Wiley and Sons, New York, N.Y., 1995. The dispersion of S$\alpha$S random variables is defined hereinbelow. For $\alpha=p=2$, this method reduces to the covariance. This method works well, but it is undefined for $\alpha<1$. From sampling studies, this correlator gives inconsistent results for $\alpha<1$, as well as for the case of measurement noise on the input, n, for signal and noise with alpha in the range $1 \leq \alpha \leq 2$.

THE INVENTIVE CODIFFERENCE CORRELATOR

In now discussing the codifference correlator according to the present invention, first the codifference will be defined; properties of the codifference will be enumerated through summarization of textbook information. Next, the codifference of the real and imaginary parts of a complex, isotropic S$\alpha$S random variable will be derived. Then, these results and properties will be combined in a derivation of the inventive codifference correlator as an estimator of bivariate dependence.

Codifference

The codifference is a measure of bivariate dependence that is defined for S$\alpha$S random variables with any characteristic exponent, $0<\alpha\leq 2$. In contrast, the covariation is only defined for $1<\alpha\leq 2$, and the covariance is only defined for $\alpha=2$. The characteristic function for a S$\alpha$S random variable is $$\phi(t) = \exp(iat - \gamma|t|^\alpha) \tag{3.1}$$

where $0<\alpha\leq 2$ is the characteristic exponent, $\gamma>0$ the dispersion, and $-\infty \leq a \leq \infty$ the location parameter ($a=0$ will be assumed.). See aforementioned C. L. Nikias and M. Shao, Signal Processing with Alpha-Stable Distributions and Applications, John Wiley and Sons, New York, N.Y., 1995. The codifference of two real-valued, jointly S$\alpha$S random variables x and y is $$\tau_{x,y} = \gamma_x + \gamma_y - \gamma_{x-y} \tag{3.2}$$

where $\gamma_x$, $\gamma_y$ and $\gamma_{x-y}$ are the dispersion parameters for x, y and x-y, respectively. See aforementioned G. Samorodnitsky and M. S. Taqqu, Stable Non-Gaussian Random Processes: Stochastic Models with Infinite Variance, Chapman and Hall, New York, N.Y., 1994. The codifference estimate is $$\hat{\tau}_{x,y} = \hat{\gamma}_x + \hat{\gamma}_y - \hat{\gamma}_{x-y} \tag{3.3}$$

The codifference has various properties; see aforementioned G. Samorodnitsky and M. S. Taqqu, Stable Non-Gaussian Random Processes: Stochastic Models with Infinite Variance, Chapman and Hall, New York, N.Y., 1994. The codifference is symmetric, $\tau_{x,y}=\tau_{y,x}$. For $\alpha=2$, the codifference reduces to the covariance. If x and y are independent, then $\tau_{x,y}=0$ for $0<\alpha\leq 2$. An important relation when x and y are independent is $$\gamma_{x-y} = \gamma_x + \gamma_y \tag{3.4}$$

If $\tau_{x,y}=0$, then x and y are independent for $0<\alpha<1$. The upper and lower limits on $\tau_{x,y}$ are $$\tau_{x,y} \leq \gamma_x + \gamma_y$$

$$\tau_{x,y} \geq \begin{cases} 0 & 0 < \alpha < 1 \\ (1 - 2^{\alpha-1})(\gamma_x + \gamma_y) & 1 \leq \alpha \leq 2 \end{cases} \tag{3.5}$$

Also, as $\tau_{x,y}$ becomes larger x and y become "more dependent."

The dispersion is related to the fractional lower-order moments $$\gamma_x = C(p,\alpha)^{-\alpha/p} E[|x|^p]^{\alpha/p} \tag{3.6}$$

where $-1<p<\alpha$, and $$C(p, \alpha) = 2^p \Gamma\left(\frac{p+1}{2}\right) \frac{\Gamma\left(1 - \frac{p}{\alpha}\right)}{\Gamma\left(\frac{1}{2}\right)\Gamma\left(1 - \frac{p}{2}\right)} \tag{3.7}$$

See aforementioned C. L. Nikias and M. Shao, Signal Processing with Alpha-Stable Distributions and Applications, John Wiley and Sons, New York, N.Y., 1995.

Using the fractional lower-order moment, the dispersion is estimated by $$\hat{\gamma}_x = C(p, \alpha)^{-\alpha/p} \left(\frac{1}{N} \sum_{k=1}^{N} |x_k|^p\right)^{\alpha/p} \tag{3.8}$$

Dispersion estimates are made using equations (3.3) and (3.8). For alpha known, the normalized sampling error for the dispersion is approximately $$\frac{\sqrt{N \, Var[\hat{\gamma}]}}{\gamma} = \frac{\alpha}{|p|} \sqrt{\frac{C(2p, \alpha)}{C(p, \alpha)^2} - 1} \tag{3.9}$$

See Robert D. Pierce, "Inconsistencies in parameters estimated from impulsive noise", Current Topics in Nonstationary Analysis, Proc. Second Workshop on Nonstationary Random Processes and their Applications, San Diego, Calif., Jun. 11–12, 1995, edited by G. Trevino, et al, World Scientific, River Edge, N.J., pp 15–33, (1996), incorporated herein by reference.

Figure 3:
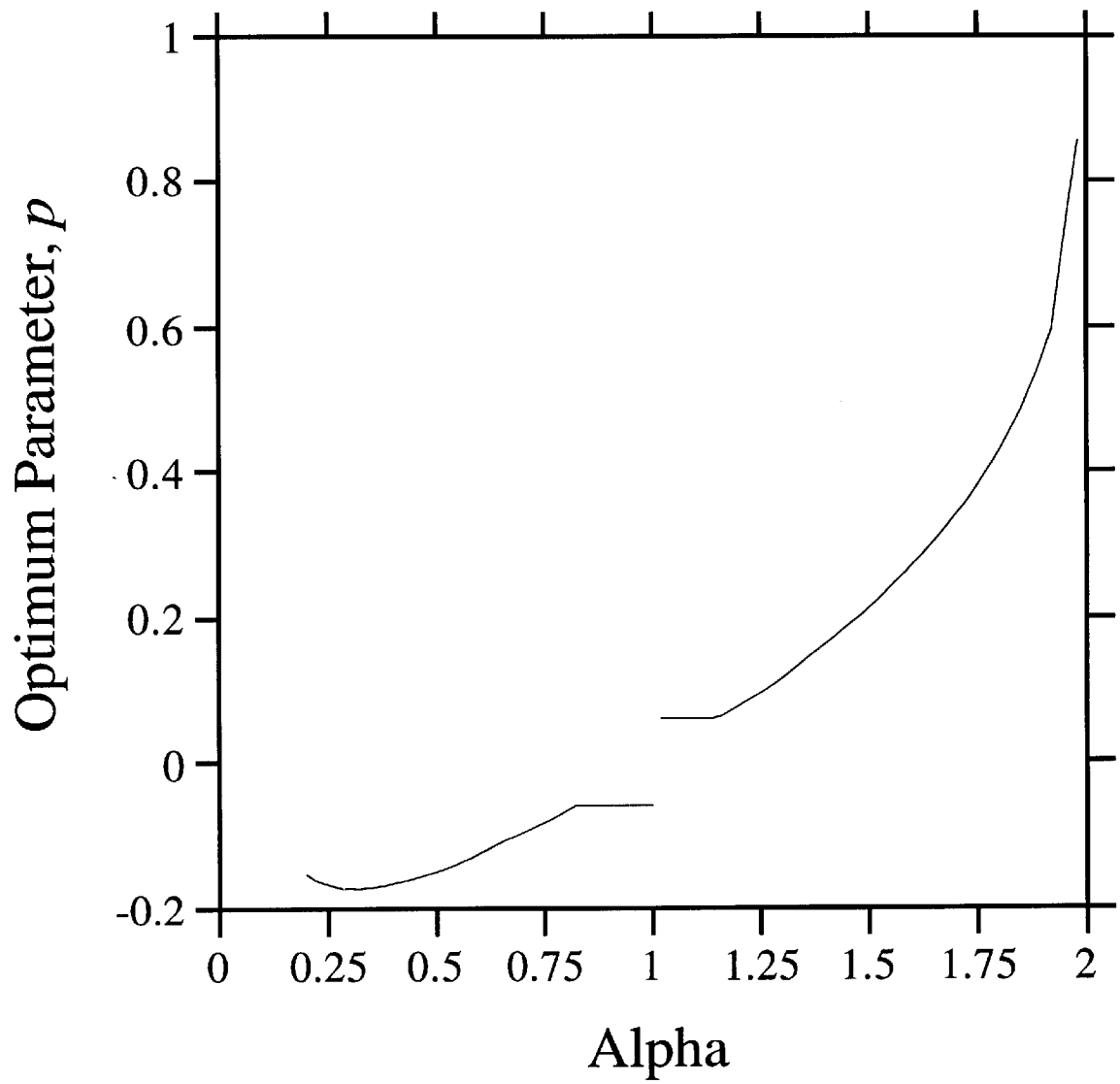
FIG. 3 is a graphical representation of parameter, p, at minimum error.

Referring to FIG. 3, numerical evaluation of the error equation allows selection of the parameter, p, that gives minimum error for a given alpha, $p_{opt}$. A plot of $p_{opt}$ is represented in FIG. 3. To prevent possible computation problems, a limit was placed on $p_{opt}$ such that $|p_{opt}| \geq 0.06$. The error versus alpha curves are shallow, so this restriction has little practical significance. As seen later, the codifference correlator uses a difference normalization such that the normalized codifference correlator error is approximately $$\frac{\sqrt{N \, Var[\hat{\gamma}]}}{2^\alpha \gamma} = \frac{\alpha}{2^\alpha |p|} \sqrt{\frac{C(2p, \alpha)}{C(p, \alpha)^2} - 1} \quad (3.10)$$

Figure 4:
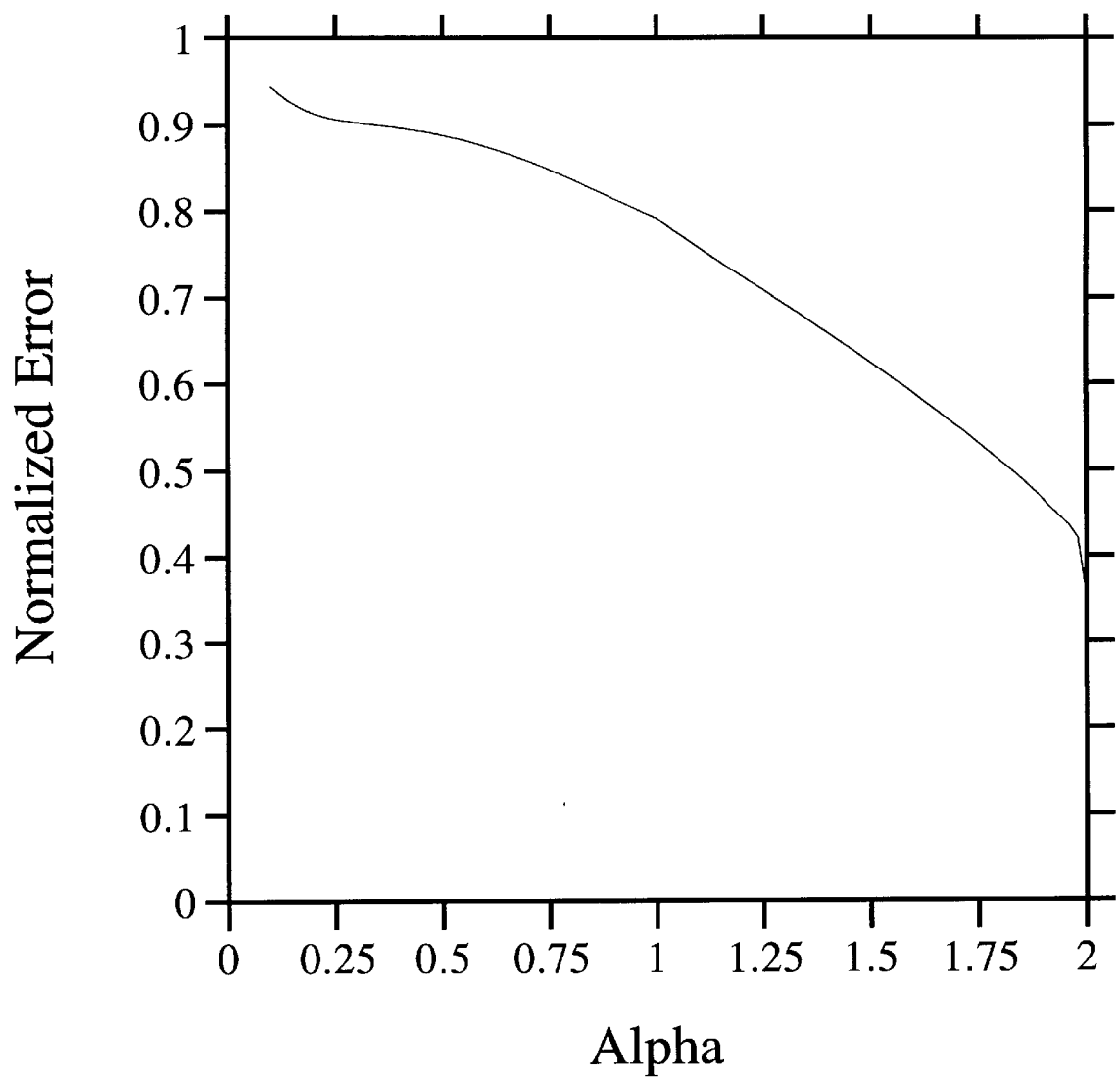
FIG. 4 is a graphical representation of minimum normalized correlator error.

The normalized codifference correlator error relationship is illustrated in FIG. 4.

Codifference of Real and Imaginary Terms

The development of the present invention's codifference correlator is based on the codifference of the real and imaginary terms. Complex, isotropic SαS random variables have the form $$z = z_R + i z_I = A^{1/2}(g_R + i g_I) \quad (3.11)$$

where $g_R$ and $g_I$ are identically distributed, independent Gaussian random variables, and A is a fully skewed alpha-stable random variable (positive alpha-stable, PaS) with $\alpha_{PaS} = \alpha_{S\alpha S}/2$; see aforementioned G. Samorodnitsky and M. S. Taqqu, Stable Non-Gaussian Random Processes: Stochastic Models with Infinite Variance, Chapman and Hall, New York, N.Y., 1994. Except for α=2, the real and imaginary terms are not independent.

Consider the codifference between the real and imaginary terms were $\mu$ and $\upsilon$ are real-valued constants $$\tau_{\mu z_R, \upsilon z_I} = \gamma_{\mu z_R} + \gamma_{\upsilon z_I} - \gamma_{z_R - \upsilon z_I} \quad (3.12)$$

From equation (3.6), the first two dispersion terms are $$\gamma_{\mu z_R} = |\mu|^\alpha \gamma_{z_R} \text{ and } \gamma_{\upsilon z_I} = |\upsilon|^\alpha \gamma_{z_I} \quad (3.13)$$

and $\gamma_{z_R} = \gamma_{z_I}$. Next, $$\gamma_{\mu z_R - \upsilon z_I} = C(p,\alpha)^{-\alpha/p} E[|\mu z_R - \upsilon z_I|^p]^{\alpha/p},$$

$$E[|\mu z_R - \upsilon z_I|^p] = E[A^{p/2}] E[|\mu g_R - \upsilon g_I|^p], \text{ and}$$

$$E[|\mu g_R - \upsilon g_I|^p]^{2/p} = \mu^2 E[|g_R|^p]^{2/p} + \upsilon^2 E[|g_I|^p]^{2/p}$$

so $$\gamma_{\mu z_R - \upsilon z_I} = (\mu^2 + \upsilon^2)^{\alpha/2} \gamma_{z_R} \quad (3.14)$$

So, $$\tau_{\mu z_R, \upsilon z_I} = (|\mu|^\alpha + |\upsilon|^\alpha - (\mu^2 + \upsilon^2)^{\alpha/2}) \gamma_{z_R} \quad (3.15)$$

Codifference Correlator

Consider two complex, isotropic SαS random variables, x' and y' that have a linear relationship and additive noise in both variables. Again, this basic model is presented in FIG. 2. The objective is to quantify the degree of dependence represented by h.

From the model in FIG. 2, $$x' = x'_R + i x'_I = (x_R + n_R) + i(x_I + n_I) \quad (3.16)$$

and $$y' = y'_R + i y'_I = (h_R x_R - h_I x_I + m_R) + i(h_I x_R + h_R x_I + m_I) \quad (3.17)$$

h is estimated by taking the sum and difference of various codifference estimates between the real and imaginary parts. The codifference correlator is $$\hat{h} = [(\hat{\tau}_{x'_R, -y'_R} - \hat{\tau}_{x'_R, y'_R} + \hat{\tau}_{x'_I, y'_I} - \hat{\tau}_{x'_I, y'_I}) + i(\hat{\tau}_{x'_R, -y'_I} - \hat{\tau}_{x'_R, y'_I} - (\hat{\tau}_{x'_I, y'_R} - \hat{\tau}_{x'_I, y'_R}))]/(2^\alpha \hat{\gamma}_{x'}) \quad (3.18)$$

By treating the numerator and denominator separately, the expected value of h is approximately $$E[\hat{h}] = E[(\hat{\tau}_{x'_R, -y'_R} - \hat{\tau}_{x'_R, y'_R} + \hat{\tau}_{x'_I, -y'_I} - \hat{\tau}_{x'_I, y'_I}) + i(\hat{\tau}_{x'_R, -y'_I} - \hat{\tau}_{x'_R, y'_I} - (\hat{\tau}_{x'_I, -y'_R} - \hat{\tau}_{x'_I, y'_R}))]/(2^\alpha E[\hat{\gamma}_{x'}]) \quad (3.19)$$

where $E[\gamma_{x'}] = \gamma_{x'}$ is defined as $$\gamma_{x'} = \gamma_{x_R} + \gamma_{x_I} \quad (3.20)$$

Note that from equation (3.11), $\gamma_{x'_R} = \gamma_{x'_I}$. When estimating $\gamma_{x'}$, the real and imaginary terms would be estimated separately and added together. Next, $E[\hat{\tau}_{s,t}] = \tau_{s,t}$, so expanding the codifference $$\tau_{x'_R, -y'_R} - \tau_{x'_R, y'_R} + \tau_{x'_I, -y'_I} - \tau_{x'_I, y'_I} = \gamma_{x'_R, y'_R} - \gamma_{x'_R, -y'_R} +$$

$$\gamma_{x_I + y_I} - \gamma_{x_I - y_I} = \gamma_{x_R + n_R + h_R x_I + m_R} - \gamma_{x_R + n_R - h_R x_I - m_R} +$$

$$\gamma_{x_I + n_I + h_I x_R + h_R x_I + m_I} - \gamma_{x_I + n_I - h_I x_R - h_R x_I - m_I} \quad (3.21)$$

and $$\tau_{x'_R, -y'_I} - \tau_{x'_R, y'_I} - (\tau_{x'_I, y'_R}) =$$

$$\gamma_{x_R + y_I} - \gamma_{x_R + y_I} - \gamma_{x_I + y_R} + \gamma_{x_I - y_R} =$$

$$\gamma_{x_R + n_R + h_I x_R + h_R x_I + m_I} - \gamma_{x_R + n_R - h_I x_R - h_R x_I - m_I} -$$

$$\gamma_{x_I + n_I + h_R x_R - h_I x_I + m_R} + \gamma_{x_I + n_I - h_R x_R + h_I x_I - m_R} \quad (3.22)$$

As an example, examine the difference, $\tau_{x'_R, -y'_R} - \tau_{x'_R, y'_R}$, and apply the properties from equations (3.2) and (3.4)

$$\gamma_{x_R + n_R + h_R x_R - h_I x_I + m_R} - \gamma_{x_R + n_R - h_R x_R + h_I x_I - m_R} = \gamma_{(1 + h_R) x_R - h_I x_I} +$$

$$\gamma_{n_R} + \gamma_{m_R} - (\gamma_{(1 - h_R) x_R + h_I x_I} + \gamma_{n_R} + \gamma_{m_R}) \quad (3.23)$$

The purpose of the difference is to cancel the additive noise terms.

$$\gamma_{x_R + n_R + h_R x_R - h_I x_I + m_R} - \gamma_{x_R + n_R - h_R x_R + h_I x_I - m_R} =$$

$$\gamma_{(1 + h_R) x_R - h_I x_I} - \gamma_{(1 - h_R) x_R + h_I x_I} \quad (3.24)$$

Next, using the result from equation (3.14)

$$\gamma_{x_R + n_R + h_R x_R - h_I x_I + m_R} - \gamma_{x_R + n_R - h_R x_R + h_I x_I - m_R} =$$

$$[((1 + h_R)^2 + h_I^2)^{\alpha/2} - ((1 - h_R)^2 + h_I^2)^{\alpha/2}] \gamma_{x_R} \quad (3.25)$$

Note that $\gamma_{x_R} = \gamma_{x_I}$ and define $$\gamma_x = \gamma_{x_R} + \gamma_{x_I} \quad (3.26)$$

Applying these methods to the remaining terms in equations (3.21) and (3.22), gives the expected value of the codifference correlator.

$$E[\hat{h}] = \{[((1 + h_R)^2 + h_I^2)^{\alpha/2} - ((1 - h_R)^2 + h_I^2)^{\alpha/2}] +$$

$$i[((1 + h_I)^2 + h_R^2)^{\alpha/2} - ((1 - h_I)^2 + h_R^2)^{\alpha/2}]\} \gamma_x / (2^\alpha \gamma_{x'}) \quad (3.27)$$

Figure 5:
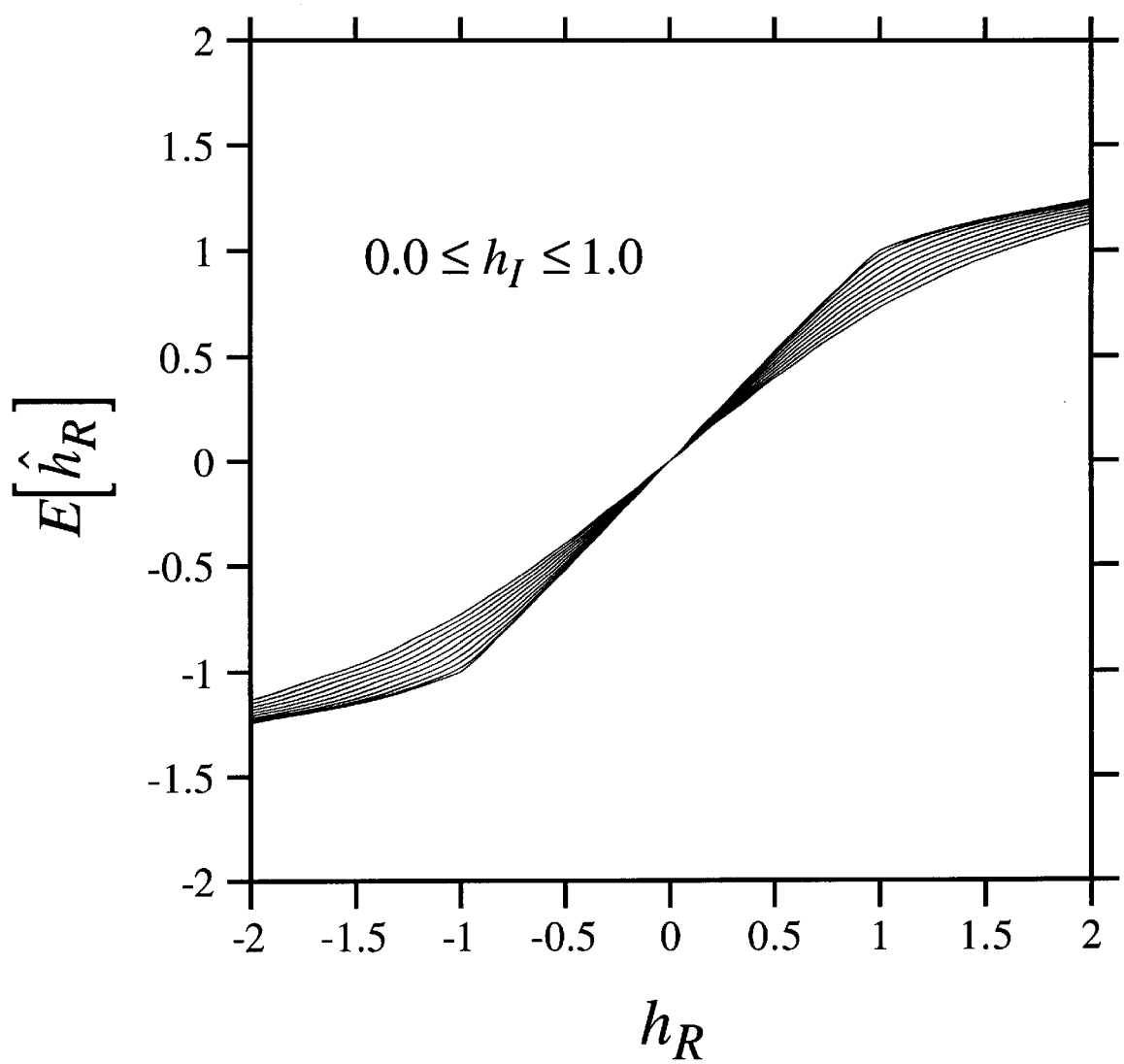
FIG. 5 is a graphical representation of estimation bias of h for α=1.25.
Figure 6:
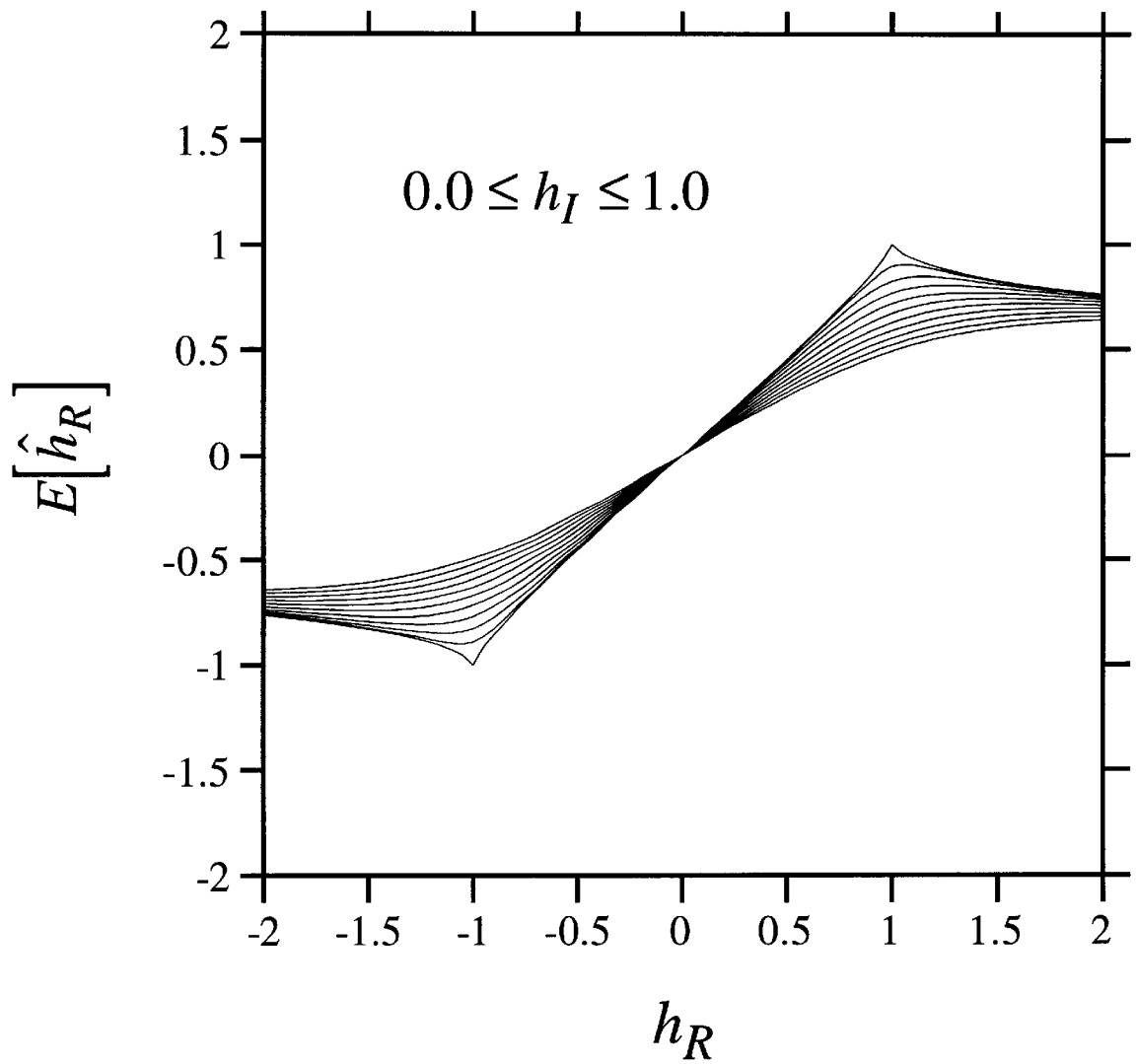
FIG. 6 is a graphical representation of estimation bias of h for α=1.25.

Referring to FIG. 5 and FIG. 6, the nonlinear estimation bias and interaction between the real and imaginary terms can be seen for $E[\hat{h}_R]$ in FIG. 5 and FIG. 6 for alpha of 1.25 and 0.75, respectively, where $h_I$ is varied from 0.0 to 1.0 in steps of 0.1 with no noise. Due to symmetry, the $E[\hat{h}_I]$ term will behave similarly. This bias is undesirable and can restrict the usefulness of the present invention's codifference approach to the region where $|h_I| < 1$. This restriction is especially true for alpha less than 1. The present invention's codifference approach, however, still provides the only consistent method for estimating h for α<1 and for $1 \le \alpha < 2$ when measurement noise is on the input.

Additional results can be obtained. A noncoherent estimate of the magnitude of h is $$|\hat{h}|^\alpha = \frac{\hat{\gamma}_{y'}}{\hat{\gamma}_{x'}} \text{ or } |\hat{h}|_{noncoh} = \left(\frac{\hat{\gamma}_{y'}}{\hat{\gamma}_{x'}}\right)^{1/\alpha} \quad (3.28)$$

By treating the numerator and denominator separately, the expected value of each term is obtained where $$\gamma_{x'_R} = \gamma_{x_R} + \gamma_{n_R} \text{ and } \gamma_{x'_I} = \gamma_{x_I} + \gamma_{n_I} \quad (3.29)$$

so $$\gamma_{x'} = \gamma_x + \gamma_n \quad (3.30)$$

and $$\gamma_{y'_R} = (h_R^2 + h_I^2)^{\alpha/2} \frac{\gamma_x}{2} + \gamma_{m_R}$$

and $$\gamma_{y'_I} = (h_R^2 + h_I^2)^{\alpha/2} \frac{\gamma_x}{2} + \gamma_{m_I}. \quad (3.31)$$

so $$\gamma_{y'} = (h_R^2 + h_I^2)^{\alpha/2} \gamma_x + \gamma_m \quad (3.32)$$

The expected value of the magnitude of h estimator is approximately $$E[|\hat{h}|^\alpha] = [(h_R^2 + h_I^2)^{\alpha/2}\gamma_x + \gamma_m]/(\gamma_x + \gamma_n) \quad (3.33)$$

Sampling Studies

Sampling studies demonstrate the statistical efficiency of the inventive codifference correlator in the presence of additive noise on the input and output. For this study, the signal, and noise dispersions were: $\gamma_x = \gamma_n = \gamma_m = 1$, and h=(0.45,−0.45). N independent computer generated S$\alpha$S complex random variables were drawn and the results calculated for each correlator (viz., the second-order correlator, the covariation correlator and the inventive codifference correlator). This process was repeated 50 times and the mean and standard deviation (random error estimate) were calculated for each set of results. The standard deviation was normalized by multiplying by $\sqrt{N}$. N was varied from 100, 200, 400, 800 and 1600. The normalized error was calculated according to equation (3.10).

Figure 7:
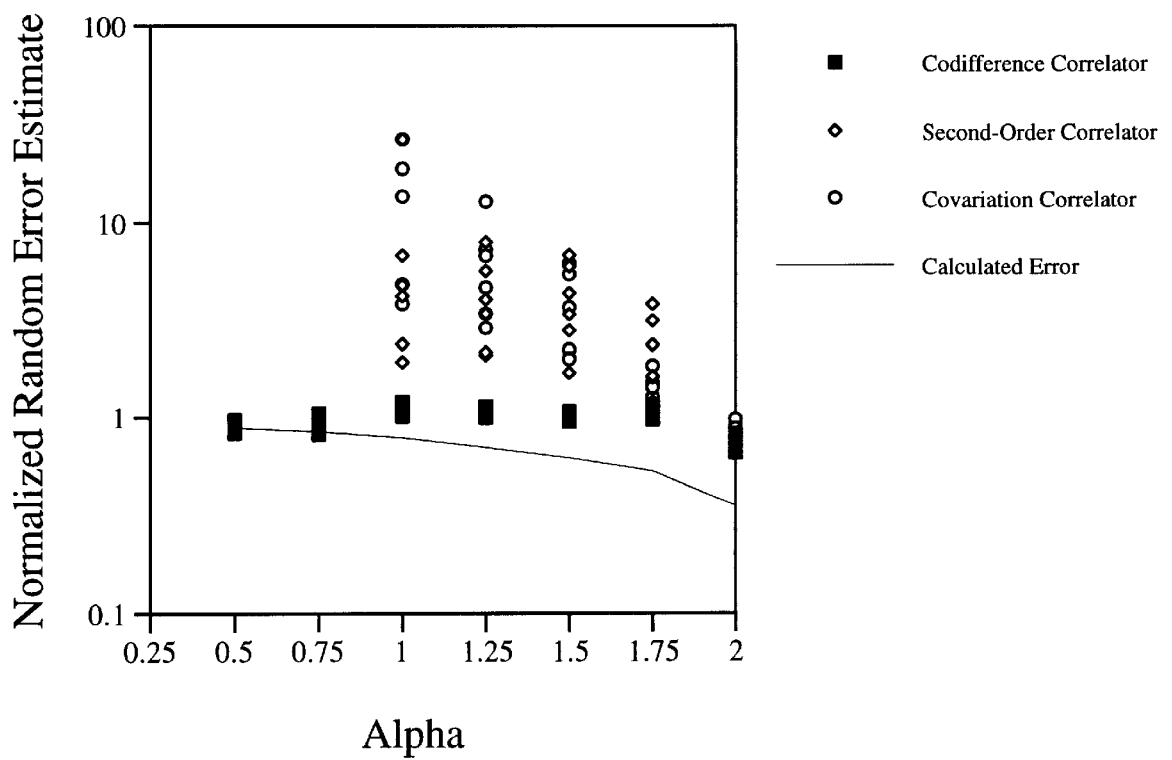
FIG. 7 is a graphical representation of normalized random error for each correlator for a range of alpha.

Reference is now made to FIG. 7. As alpha was varied from 0.5, 0.75, 1.0, 1.25, 1.5, 1.75 and 2.0, FIG. 7 shows the random error estimates for the output from each correlator. For alpha less than one, the second-order correlator and covariation correlator are not expected to work, so their results are not shown. The inventive codifference correlator shows stability as N and alpha are varied. The calculated error tends to underestimate the inventive codifference correlator error. Note, however, that the calculated error was derived for dispersion estimates and is intended to give an approximate idea of the inventive codifference correlator error; for this purpose, it works well. The second-order and covariation correlators show error variations over one order of magnitude.

Figure 8:
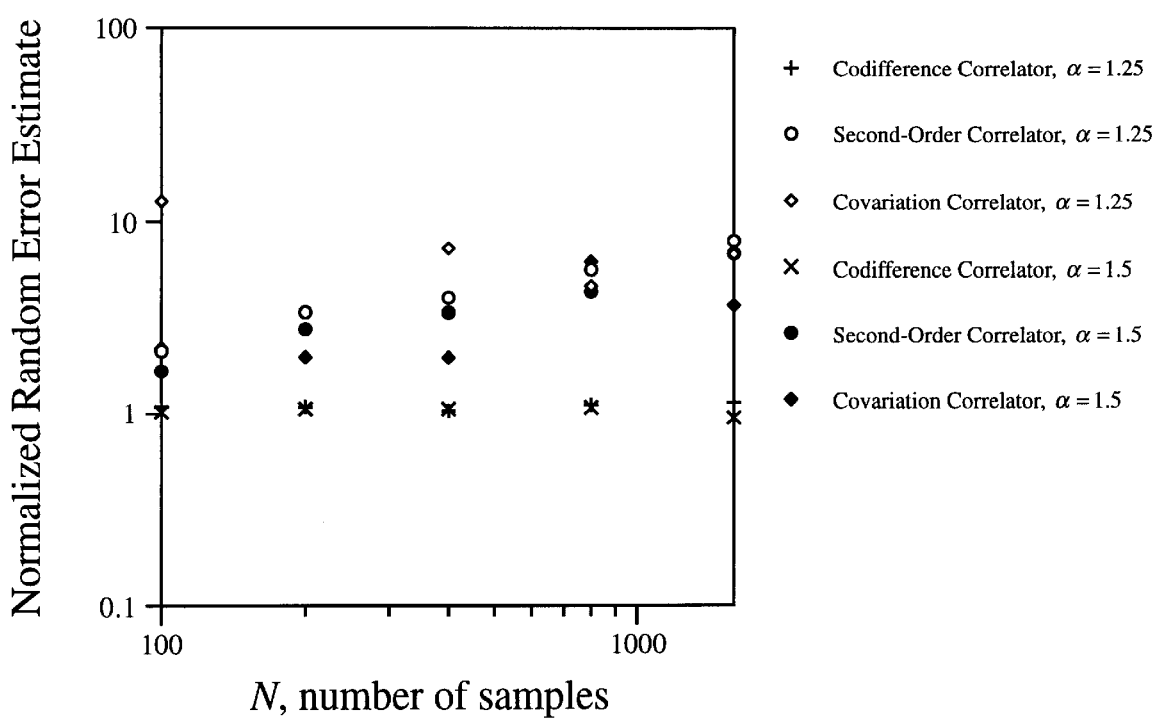
FIG. 8. is a graphical representation of normalized random error for each correlator as the number of samples is varied.

With reference to FIG. 8, for alpha of 1.25 and 1.5, the random error estimates are shown in FIG. 8 as a function of N. This demonstrates that the second-order correlator and the covariation correlator show random error increasing with increased sample size. The conclusion is that the second-order and covariation correlators are not statistically efficient, a fundamental requirement of any estimator. For additive noise on the input and output, the second-order and covariation correlators give inconsistent results. By contrast, the inventive codifference correlator gives consistent results.

Source Code

The following source code is illustrative of the second-order correlator, the covariation correlator and especially the inventive codifference correlator. This source code is written in the programming language called Interactive Data Language (IDL), a product of Research Systems, Inc., 4990 Pearl East Circle, Boulder, Colo. 80301. This source code is presented to demonstrate the implementation of the various correlators, and in particular the inventive codifference correlator.

xx is an array of N samples that represents x' and yy is an array of N samples that represents y'. The second-order correlator from equation (2.1) is written as sec_order_correl=mean(*conj(xx)\*yy*)/mean(abs(*xx*)^2)

where sec_order_correl is the result from the second-order correlator, mean(array_name) is an IDL library function that calculates the sample mean of the named array, and abs(array_name) is an IDL librar function that returns the absolute value of the named array. The covariation correlator from equation (2.3) with p=1 is written as covar_correl=mean(conj(*xx*)\**yy*/abs(*xx*))/mean(abs(*xx*))

where covar_correl is the result from the covariation correlator, and conj(array_name) is an IDL library function that returns the complex conjugate of the named array.

The codifference correlator is presented as an IDL subroutine, codif_cmplx, that takes the arrays xx and yy, and the constant alpha, and returns gam_xx, $\gamma_{x'}$, gam_y; $\gamma y$,', and cod_xy, the result from the codifference correlator. Comment lines in IDL begin with a semicolon.

```
pro codif_cmplx, xx, yy, alpha, gam_xx, gam_yy, cod_xy
;
    if alpha gt 2.0 then alpha = 2.0
;
    find_pp, alpha, pp, norm_gam_err
;
; find_pp is an IDL subroutine that takes the constant alpha and returns the optimum value
for p
; the norm_gam_err value is calculated according to equation (3.10), this value is returned
but not used
```

```
;
    if alpha eq 2.0 then c_fact = 4.*gamma(1.5)/gamma(0.5)
    if alpha lt 2.0 then c_fact = (2.^pp)*gamma((pp+1.)/2.)*gamma(1.-pp/alpha)/$
                (gamma(1./2.)*gamma(1.-pp/2.))
;
; c_fact is the parameter C(p,α) from equation (3.7)
; gamma() is the IDL library Gamma function
;
    gam_xx = ( mean( abs(float(xx))^pp )/c_fact )^(alpha/pp) + $
             ( mean( abs(imaginary(xx))^pp )/c_fact )^(alpha/pp)
;
; float() and imaginary() are IDL Library functions that return, respectively, the real and
imaginary parts or an array
;
    gam_yy = ( mean( abs(float(yy))^pp )/c_fact )^(alpha/pp) + $
             ( mean( abs(imaginary(yy))^pp )/c_fact )^(alpha/pp)
;
    gam_xpy_r = ( mean( abs(float(xx)+float(yy))^pp )/c_fact )^(alpha/pp) + $
                ( mean( abs(imaginary(xx)+imaginary(yy))^pp )/c_fact )^(alpha/pp)
    gam_xpy_i = ( mean( abs(float(xx)+imaginary(yy))^pp )/c_fact )^(alpha/pp) - $
                ( mean( abs(imaginary(xx)+float(yy))^pp )/c_fact )^(alpha/pp)
    gam_xpy = complex(gam_xpy_r,gam_xpy_i)
;
; complex(a,b) is an IDL Library function that takes two real variables and returns the
complex number, a + ib
;
    gam_xny_r = ( mean( abs(float(xx)-float(yy))^pp )/c_fact )^(alpha/pp) + $
                ( mean( abs(imaginary(xx)-imaginary(yy))^pp )/c_fact )^(alpha/pp)
    gam_xny_i = ( mean( abs(float(xx)-imaginary(yy))^pp )/c_fact )^(alpha/pp) - $
                ( mean( abs(imaginary(xx)-float(yy))^pp )/c_fact )^(alpha/pp)
    gam_xny = complex(gam_xny_r,gam_xny_i)
;
    cod_xy = (gam_xpy-gam_xny)/(gam_xx*2.^alpha)
;
    return
    end
```

The codifference correlator subroutine calls the subroutine find_pp that takes the constant alpha and returns the optimum value for p, and the normalized error value, norm_gam_err, as calculated according to equation (3.10). This routine uses a lookup table of alpha and optimum p to interpolate using the alpha parameter passed to the subroutine.

```
pro find_pp, alpha, pp, gam_err
;
; given alpha, return optimum p and normalized estimation error for gamma
;
    alp = [2.00,1.95,1.90,1.85,1.80,1.75,1.70,1.65,1.60,1.55,1.50,$
    1.45,1.40,1.35,1.30,1.25,1.20,1.15,1.10,1.05,1.00,$
    0.95,0.90,0.85,0.80,0.75,0.70,0.65,0.60,0.55,0.50,$
    0.45,0.40,0.35,0.30,0.25,0.20,0.15,0.10]
;
    ppopt = [ 0.992, 0.651, 0.551, 0.483, 0.424, 0.380, 0.337, 0.302, 0.273, $
    0.239, 0.213, 0.186, 0.166, 0.140, 0.115, 0.096, 0.077, 0.059, $
    0.041, 0.023,-0.015,-0.012,-0.035,-0.051,-0.068,-0.084,-0.096, $
    -0.112,-0.124,-0.140,-0.151,-0.159,-0.168,-0.173,-0.175,-0.172, $
    -0.158,-0.132,-0.096]
;
    num_alp = 39
;
    pp = 2.0
    if alpha ge 2.0 then goto, L10
    pp = -0.096
    if alpha lt 0.1 then goto, L10
;
    val = where(abs(alpha-alp) lt 0.076,count)
    coef = poly_fit(alp(val),ppopt(val),1)
    pp = coef(0) + coef(1)*alpha
    if pp ge 0.0 and pp lt 0.06 then pp = 0.06
    if pp lt 0.0 and pp gt -0.06 then pp = -0.06
```

-continued

```
;
L10:
;
    alph = alpha
    if alpha ge 2.0 then alph = 2.0
;
    if alph lt 2.0 then mom_p1 = (2.^pp)*gamma((pp+1.)/2.)*gamma(1.-pp/alph)/$
                (gamma(1./2.)*gamma(1.-pp/2.))
    if alph lt 2.0 then mom_p2 = (2.^(2.*pp))*gamma((2.*pp+1.)/2.)*gamma(1.-
2.*pp/alph)/$
                (gamma(1./2.)*gamma(1.-pp))
    if alph eq 2.0 then mom_p1 = (2.^pp)*gamma(1.5)/gamma(0.5)
    if alph eq 2.0 then mom_p2 = (2.^(2.*pp))*gamma(2.5)/gamma(0.5)
    gam_err = alph*sqrt( mom_p2/(mom_p1^2) - 1.)/(abs(pp)*(2.^alph))
return
end
```

Zero Valuation of Imaginary Values

The use of complex valued random variables is a generalization. The inventive codifference correlator can also be expressed with the imaginary values set to zero and all the equations, now simplified, will hold.

Estimation of Transfer Functions

A property of SαS random variables is that a linear operation will still result in a SαS random variable with the same alpha. Such an operation is the fast Fourier transform, FFT. The codifference correlator can be applied to spectrum analysis or radar Doppler processing where it's possible to estimate transfer functions by combining it with the Welch method; see P. D. Welch, "The use of fast Fourier transform for the estimation of power spectra: A method based on time averaging over short, modified periodograms," IEEE Trans. Audio Electroacoust., AU-15, June 1967, pp 70–73, incorporated herein by reference.

The classical approach uses the second-order correlator for transfer function estimates $$\hat{H}_{so}(\omega_j) = \frac{\frac{1}{N}\sum_{n=1}^{N} Y_n(\omega_j)X_n^*(\omega_j)}{\frac{1}{N}\sum_{n=1}^{N} X_n(\omega_j)X_n^*(\omega_j)} \quad (5.1)$$

and the FFT of the $n^{th}$ windowed, overlapping data segment with N total segments is $$X_n(\omega_j) = \frac{1}{K}\sum_{k=1}^{K} x((k-1+\xi_n)\Delta t)\kappa(k\Delta t)e^{-i\omega_j\Delta t(k-1)} \quad (5.2)$$

at frequency $\omega_j=2\pi(j-1)/K\Delta t$, where $\xi_n=(n-1)S$ and each segment is shifted S samples relative to the last segment. Also, K is the FFT size, $\kappa(k\Delta t)$ is the window function and $\Delta t$ is the time between samples. The $Y_n(\omega_j)$ is obtained in the same manner. Since the $X_n(\omega_j)$ and $Y_n(\omega_j)$ are SαS distributed, the codifference correlator can be applied to estimate the transfer function $$\hat{H}_{cd}(\omega_j) = [(\Delta A) + i(\Delta B)]/(2^\alpha \hat{\gamma}_{X(\omega_j)}) \quad (5.3)$$

$$\Delta A = \hat{\tau}_{X_R(\omega_j), -Y_R(\omega_j)} - \hat{\tau}_{X_R(\omega_j), Y_R(\omega_j)} + \hat{\tau}_{X_I(\omega_j), -Y_I(\omega_j)} - \hat{\tau}_{X_I(\omega_j), Y_I(\omega_j)}$$

$$\Delta B = \hat{\tau}_{X_R(\omega_j), -Y_I(\omega_j)} - \hat{\tau}_{X_R(\omega_j), Y_I(\omega_j)} - (\hat{\tau}_{X_I(\omega_j), Y_R(\omega_j)} - \hat{\tau}_{X_I(\omega_j), Y_R(\omega_j)})$$

and $$\hat{\gamma}_{X(\omega_j)} = \hat{\gamma}_{X_R(\omega_j)} + \hat{\gamma}_{X_I(\omega_j)} \quad (5.4)$$

where the averages are taken over the N segments. Also, $$\hat{\gamma}_{Y(\omega_j)} = \hat{\gamma}_{Y_R(\omega_j)} + \hat{\gamma}_{Y_I(\omega_j)} \quad (5.5)$$

so from equation (3.28), a noncoherent estimate of the transfer function is $$|\hat{H}_{noncoh}(\omega_j)| = \left(\frac{\hat{\gamma}_{Y(\omega_j)}}{\hat{\gamma}_{X(\omega_j)}}\right)^{1/\alpha} \quad (5.6)$$

A form of the coherence function follows $$\hat{\xi}_{XY}(\omega_j) = \frac{|\hat{H}_{cd}(\omega_j)|}{|\hat{H}_{noncoh}(\omega_j)|} \quad (5.7)$$

Correlation Detection

Figure 9:
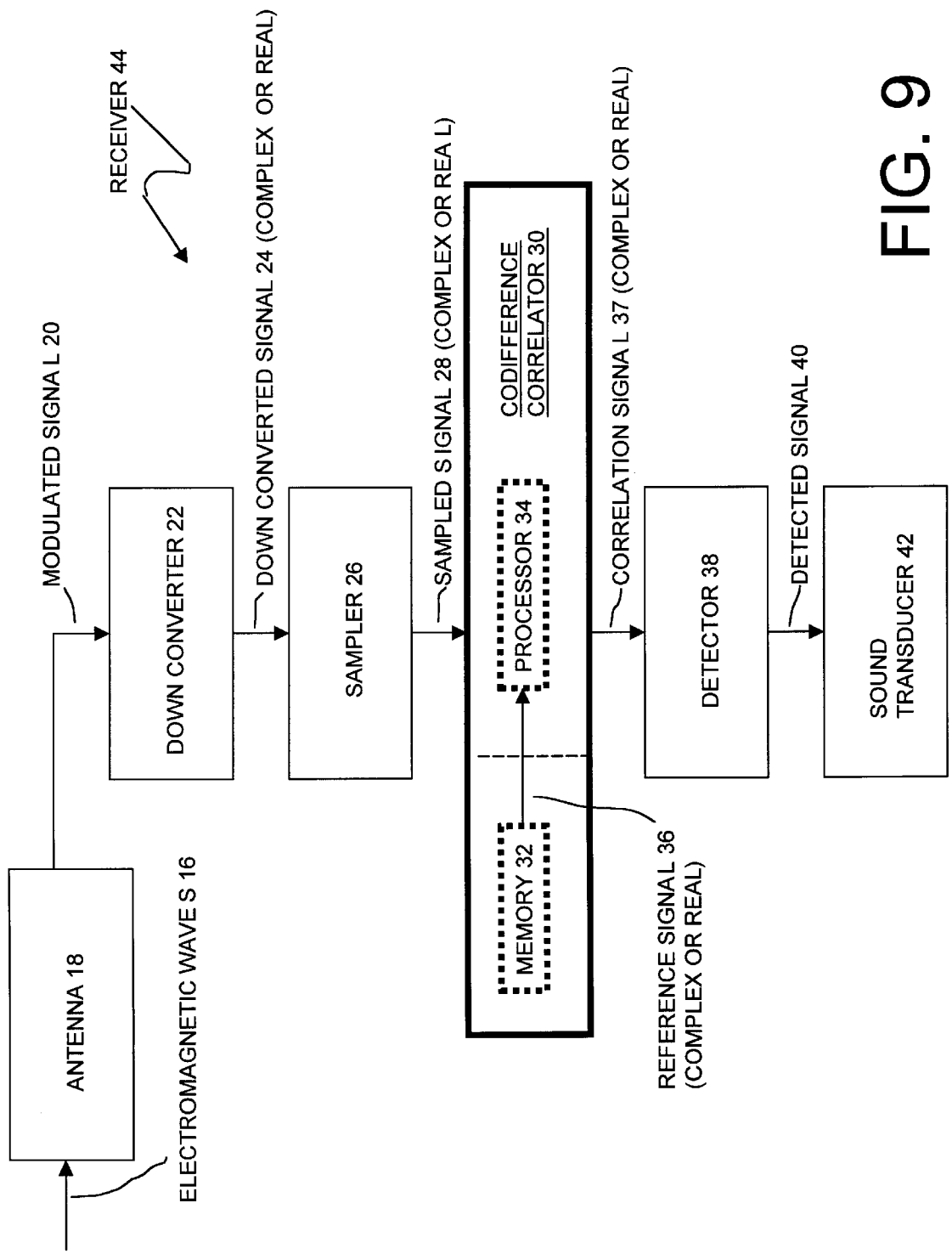
FIG. 9 is a block diagram illustrative of some embodiments in accordance with the present invention, wherein communications apparatus includes an inventive codifference correlator, and wherein a received signal and a reference signal are inventively correlated.

Referring to FIG. 9, diagrammatically illustrated is a correlation detection system (based on modulation system principles) in accordance with the present invention. Basically, the inventive codifference correlator, along with its associated components, effectuates correlation detection based on an inventive cross-correlative mathematical algorithm applied to the combination of a received signal and a locally stored or generated function, typically having some known characteristic of the transmitted wave. In other words, the inventive codifference correlator compares, in point-to-point correspondence, an observed signal with an internally generated reference signal.

Electromagnetic waves (e.g., radio waves) 16 are received by antenna 18, which sends a modulated signal 20 to down converter 22, which sends a complex down converted signal 24 to sampler 26 (e.g., including or included by a type of analog-to-digital converter). The inventive codifference correlator 30 comprises a memory 32 unit and a processor 34. Sampler 26 obtains a sequence of instantaneous values of down converted signal 24 (e.g., at regular or intermittent temporal or spatial intervals, wherein the sampling rate is at least twice the highest frequency component of down converted signal 24), and accordingly sends a complex sampled signal 28 to processor 34 (of codifference correlator 30).

Memory 32, having a complex reference signal 36 stored therein, sends complex reference signal 36 to processor 34 (of codifference correlator 30). In inventive practice, memory 32 can include a memory 32 unit made a part of codifference correlator 30 and/or a memory 32 unit which is separate from codifference correlator 30. That is, the memory 32 unit in which complex reference signal 36 is stored can be either internal to or external to codifference correlator 30.

Processor 34 applies the inventive codifference correlation algorithm to the combination of sampled signal 28 and reference signal 36. Reference signal 36 is a complex signal represented by real and imaginary components having values and defined by real and imaginary axes. Similarly, modulated signal 20 (and hence, down converted signal 24 as well as sampled signal 28) is a complex signal represented by real and imaginary components having values and defined by real and imaginary axes. Codifference correlator 30 thus cross-correlates sampled signal 28 and reference signal 36, and sends a resultant complex correlation signal 32 to detector (e.g., demodulator or mixer, or threshold or peak detector) 38. Detector 38 sends a detected signal 40 to sound transducer (e.g., headphone or loudspeaker) 42 or other information sink.

A receiver 44 (e.g., of a heterodyne or superheterodyne type) can be considered to include certain of these components, e.g., down converter 22, sampler 26, codifference correlator 30, detector 38 and sound transducer 42. The ordinarily skilled artisan is well acquainted with implementation of down converter means, sampler means, detector means and sound transducer means in the context of various communications systems.

Although the example described with reference to FIG. 9 involves inventive correlation of a received signal with a locally generated signal, it is understood by the ordinarily skilled artisan in the light of this disclosure that the present invention admits of practice involving correlation of two or more electromagnetic signals of diverse kinds and received or originating from diverse sources, such as electromagnetic waves, acoustic waves, pressure waves, etc., as well as from other sensors that sense physical quantities and convert them into electrical signals.

Figure 10:
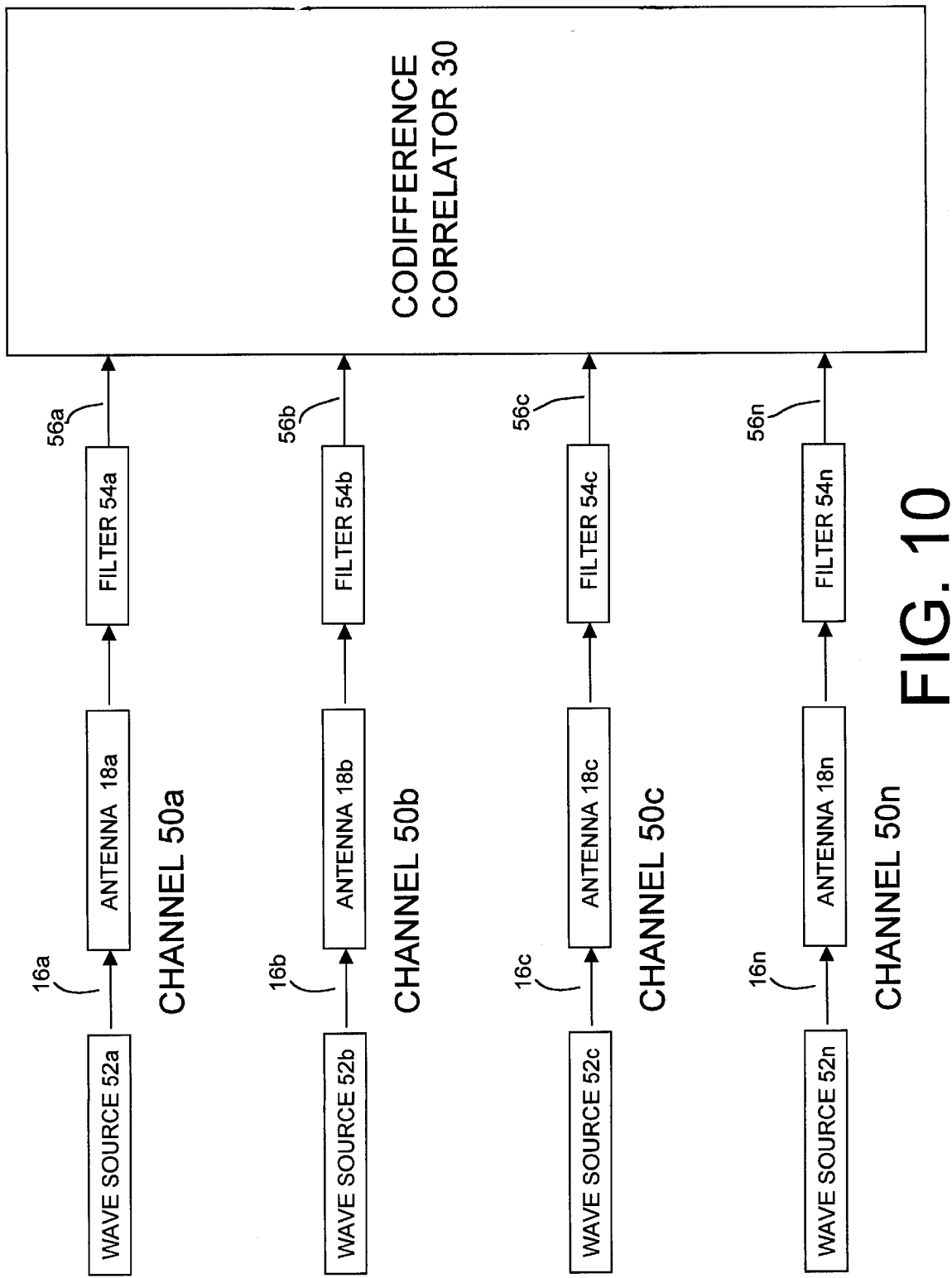
FIG. 10 is a block diagram illustrative of some embodiments in accordance with the present invention, wherein communications apparatus includes an inventive codifference correlator, wherein the communications apparatus may (depending on the embodiment) be characterized by any number of electronic channels, and wherein pairs of signals from one or more channels are invertively correlated.

Reference now being made to FIG. 10, codifference correlator 30 is connected to any number of a plurality of channels 50, viz., channel 50a, channel 50b, channel 50c, . . . channel 50n. Each channel has an antenna 18 means and a filter 54 means such as including a down converter 22 and a sampler 26. Each antenna 18 means receives waves 16 from a different wave source 52; thus, antenna 18a receives waves 16a from wave source 52a; antenna 18b receives waves 16b from wave source 52b; antenna 18c receives waves 16c from wave source 52c; antenna 18n receives waves 16d from wave source 52n. Although the term "antenna" commonly denotes a device or group of devices used for receiving electromagnetic waves such as radio waves, it is to be understood with reference to FIG. 10 that "antenna 18 means" can refer to any apparatus or apparatuses which serve to sense physical quantities or receive wave phenomena (e.g., electromagnetic waves, acoustic waves, pressure waves, etc.) and render a signal corresponding thereto.

Codifference correlator 30 receives a filtered signal 56 via each channel, viz., filtered signal 56a, filtered signal 56b, filtered signal 56c, . . . filtered Signal 56n. Codifference correlator 30 can select any pair of filtered signals 56 (e.g., filtered signal 56a plus filtered signal 56b; or, filtered signal 56a plus filtered signal 56c; or, filtered signal 56b plus filtered signal 56c; etc.), and can inventively correlate such pair of filtered signals 54 (e.g., correlate filtered signal 56a with filtered signal 56b; or, correlate filtered signal 56a plus filtered signal 56c; or, correlate filtered signal 56b with filtered signal 56c; etc.). Codifference correlator 30 can perform its algorithmic operation with respect to one pair or any plural number of pairs of filtered signals 56, and can do so once or any number of plural times.

Figure 11:
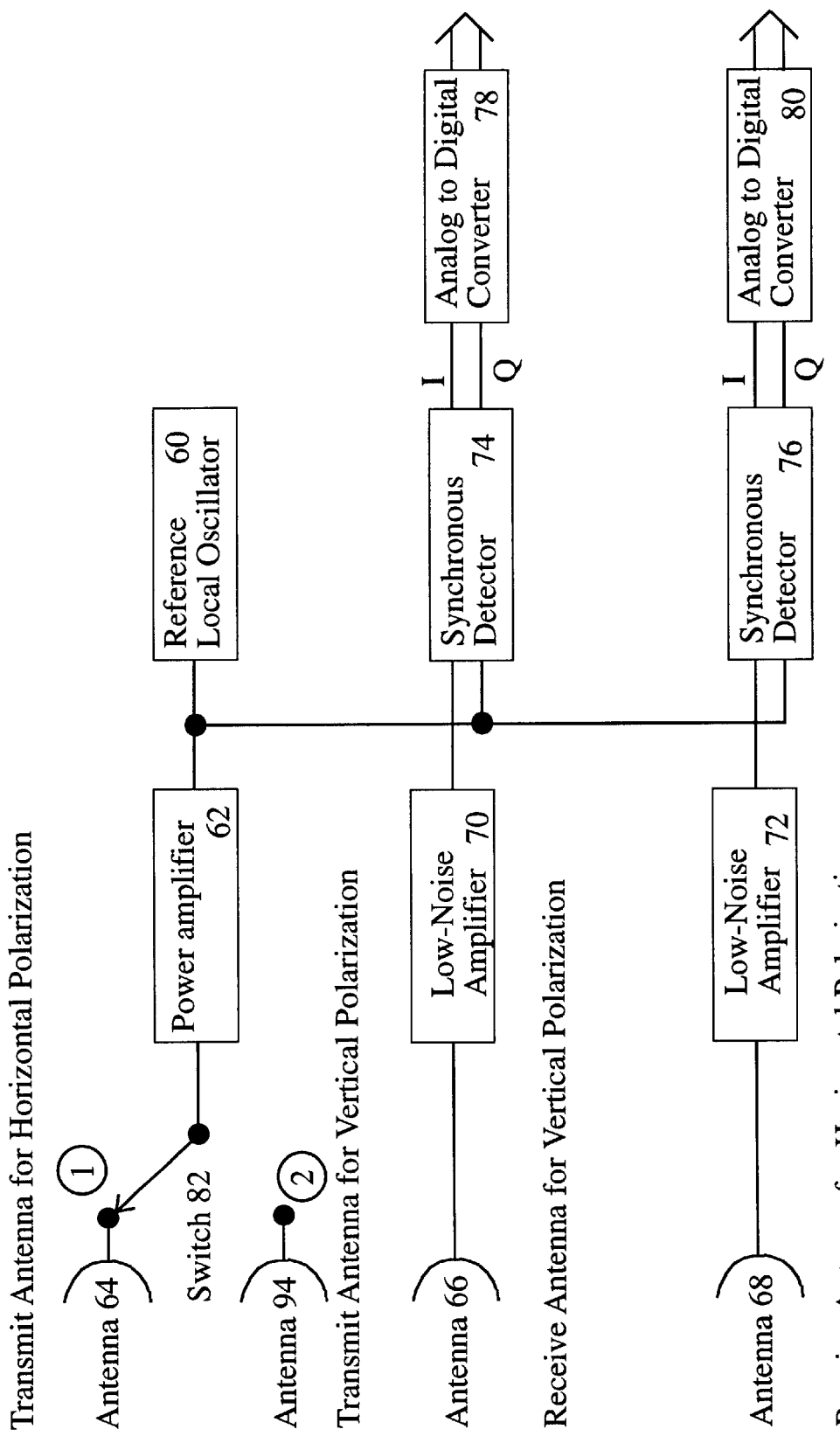
FIG. 11 and FIG. 12 are block diagrams illustrating an inventive embodiment involving effectuation of coherent radar.
Figure 12:
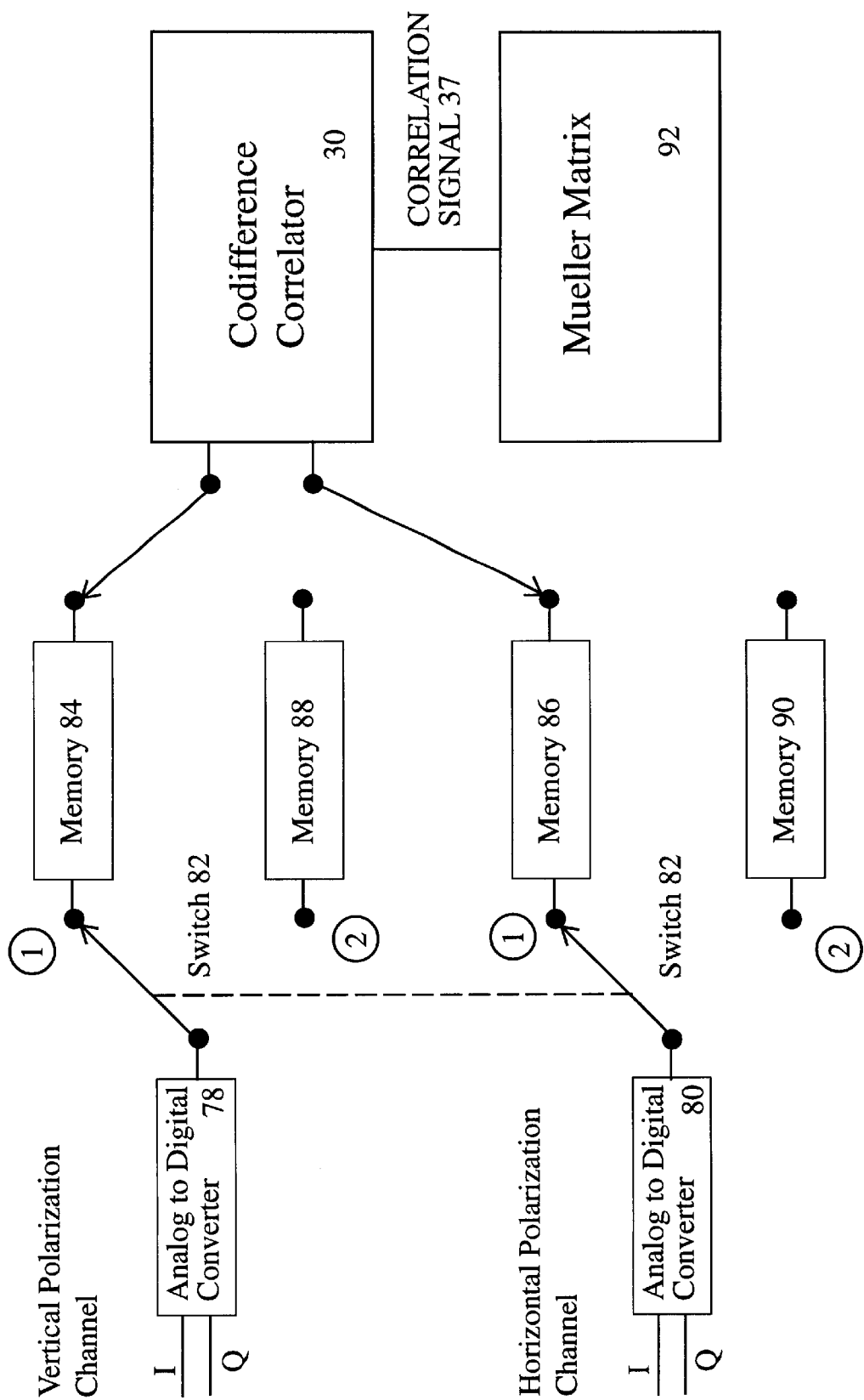

Now referring to FIG. 11 and FIG. 12, the present invention can be propitiously practiced in the context of a coherent radar system. Depicted in FIG. 11 and FIG. 12 is a coherent radar system in accordance with the present invention. The inventive coherent radar system bears some similarities to a typical coherent radar system such as practiced by the U.S. Navy. As shown in FIG. 11, the reference signal to be transmitted is derived from a local oscillator 60, which is then amplified by power amplifier 62, which then feeds transmitting antenna 64, which is initially set for horizontal polarization by the switch 82 set in position 1. When switch 82 is set in position 2, the power amplifier 62 feeds transmitting antenna 94 which is set for vertical polarization. The transmitted signal is in the form of a short burst.

The transmitted signal radiates outward, strikes a distant object, and is scattered back to antennas 66 and 68, which are collocated with transmitting antennas 64 and 94. Antenna 66 is set to receive vertically polarized waves and antenna 68 is set to receive horizontally polarized waves. The signal received by antenna 66 is amplified by low-noise amplifier 70. The signal received by antenna 68 is amplified by low-noise amplifier 72. Then the signals from low-noise amplifiers 70 and 72, along with the reference signal from local oscillator 60, go into synchronous detectors 74 and 76 (whereby the corresponding signals from low-noise amplifiers 70 and 72 go into synchronous detectors 74 and 76, respectively).

Each of synchronous detectors 74 and 76 output two signals: an in-phase signal I and a quadrature signal Q. Each I and Q pair can be interpreted as a complex signal, where I is real and Q is imaginary. The corresponding pairs of signals I and Q from synchronous detectors 74 and 76 go into analog-to-digital converters (samplers) 78 and 80, respectively.

As shown in FIG. 12, analog-to-digital converters 78 and 80 are each connected to switch 82 which also switches between the transmitting antennas 64 and 94 in FIG. 11. According to a first state (switch 82 position "one" or "1"), antenna 64 transmits a short burst signal characterized by horizontal polarization. After that pulse has returned to receiving antennas 66 and 68 and has proceeded through the aforedescribed coherent radar system so as to arrive at analog-to-digital converters 78 and 80, switch 82 having been set to position "one," the numerical values for analog-to-digital converters 78 and 80 are stored in memories 84 and 86. According to a second state (switch 82 position. "two" or "2"), antenna 94 transmits a short burst signal characterized by vertical polarization. After that pulse has returned to receiving antennas 66 and 68 and has proceeded through the aforedescribed coherent radar system so as to arrive at analog-to-digital converters 78 and 80, switch 82 having been set to position "two," the numerical values for analog-to-digital converters 78 and 80 are stored in memories 88 and 90. This procedure occurs N number of times, wherein N is any integer greater than or equal to one.

The samples stored in memories 84, 86, 88 and 90 are taken in pairs by inventive codifference correlator 30 for inventive correlation. Subsequently, correlation signal 37 can be detected by a detector 38 such as shown in FIG. 9, which can send a detected signal 40 to a sound transducer 42 (e.g., an alarm) such as shown in FIG. 9. Alternatively, as shown in FIG. 12, correlation signal 37 can be transmitted to and thereby populate averaged Mueller matrix 92, whereby the positions in averaged Mueller matrix 92 are determined by the pairs of memory signals taken from memories 84, 86, 88 and/or 90. See aforementioned article by McLaughlin, D. J., et al entitled "High Resolution Polarimetric Radar Scattering Measurements of Low Grazing Angle Sea Clutter," IEEE Journal of Oceanic Engineering, Vol. 20, No. 3, July 1995, pp 166–178, incorporated herein by reference.

The pairs of memory signals (i.e., signals taken from memory) can be taken from one or two memories among memories 84, 86, 88 and 90. That is, the pairs of memory signals can be received from one memory, i.e., auto-correlative (for example, received from memory 84, only); or, the pairs of memory signals can be received from two memories, i.e., cross-correlative (for the example shown in FIG. 12, received from memories 84 and 86). Averaged Mueller matrix 92 ranges over all possible combinations of pairs of memory signals.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. In a communication system of the type including antenna means for receiving electromagnetic waves, down converter means for down converting a modulated signal received from the antenna means, sampler means for sampling a down converted signal received from the down converter means, and memory means for storing a reference signal, a correlator for correlating said reference signal and a sampler signal received from said sampling means, said correlator comprising algorithmic means for calculating the codifference correlation based on the sum and difference of codifference estimates, wherein each said codifference estimate is equated with a corresponding dispersion estimate.

2. A correlator according to claim 1, wherein said correlator is capable of generating a correlation signal representative of said codifference correlation.

3. A correlator according to claim 2, wherein said correlation signal is capable of being detected.

4. A correlator according to claim 2, wherein said correlation signal is a complex signal.

5. A correlator according to claim 2, wherein said reference signal is a complex signal, and wherein said sampled signal is a complex signal.

6. A correlator according to claim 5, wherein said sampler means samples said down converted signal at plural points selected from the group consisting of temporal points and spatial points.

7. A correlator according to claim 1, wherein said correlator treats said reference signal as, a complex signal representative of real and imaginary terms characterized by values, and wherein said correlator treats said sampled signal as a complex signal representative of real and imaginary terms characterized by values.

8. A correlator according to claim 1:

wherein said codifference correlation is a normalized codifference correlation, wherein said algorithmic means is for calculating the codifference correlation based on estimating the codifference based on the equation $$\hat{h}=[(\hat{\tau}_{x'_R,-y'_R}-\hat{\tau}_{x'_R,y'_R}+\hat{\tau}_{x'_I,y'_I}-\hat{\tau}_{x'_I,y'_I})+i(\hat{\tau}_{x'_R,-y'_I}-\hat{\tau}_{x'_R,y'_I}-(\hat{\tau}_{x'_I,y'_R}-\hat{\tau}_{x'_I,y'_R}))]/(2^{\alpha}\hat{\gamma}_{x'});$$

wherein x' represents one of said reference signal and said sampled signal; and wherein y' represents the other of said reference signal and said sampled signal.

9. A correlator according to claim 8, wherein:

certain terms in the numerator of the right-hand expression are codifference estimates, each said codifference estimate being derived from a corresponding dispersion estimate based on the equations $$\hat{\tau}_{x'_R,-y'_R}=\hat{\gamma}_{x'_R}+\hat{\gamma}_{y'_R}-\hat{\gamma}_{x'_R+y'_R}$$

$$\hat{\tau}_{x'_R,y'_R}=\hat{\gamma}_{x'_R}+\hat{\gamma}_{y'_R}-\hat{\gamma}_{x'_R-y'_R}$$

$$\hat{\tau}_{x'_I,-y'_I}=\hat{\gamma}_{x'_I}+\hat{\gamma}_{y'_I}-\hat{\gamma}_{x'_I+y'_I}$$

$$\hat{\tau}_{x'_I,y'_I}=\hat{\gamma}_{x'_I}+\hat{\gamma}_{y'_I}-\hat{\gamma}_{x'_I-y'_I}$$

$$\hat{\tau}_{x'_R,-y'_I}=\hat{\gamma}_{x'_R}+\hat{\gamma}_{y'_I}-\hat{\gamma}_{x'_R+y'_I}$$

$$\hat{\tau}_{x'_R,y'_I}=\hat{\gamma}_{x'_R}+\hat{\gamma}_{y'_I}-\hat{\gamma}_{x'_R-y'_I}$$

$$\hat{\tau}_{x'_I,-y'_R}=\hat{\gamma}_{x'_I}+\hat{\gamma}_{y'_R}-\hat{\gamma}_{x'_I+y'_R}$$

$$\hat{\tau}_{x'_I,y'_R}=\hat{\gamma}_{x'_I}+\hat{\gamma}_{y'_R}-\hat{\gamma}_{x'_I-y'_R};$$

the real terms and imaginary terms are taken from one of said reference signal and said sampled signal $$x'=x'_R+ix'_I=(x_R+n_R)+i(x_I+n_I);\text{ and}$$

the real terms and imaginary terms are taken from the other of said reference signal and said sampled signal $$y'=y'_R+iy'_I=(h_Rx_R-h_Ix_I+m_R)+i(h_Ix_R+h_Rx_I+m_I).$$

10. A correlator according to claim 9 wherein, with regard to $x'_R$, each of said dispersion estimates is taken from the N data samples $$\hat{\gamma}_{x'_R}=(C(p,\alpha))^{-\alpha/p}\left(\frac{1}{N}\sum_{k=1}^{N}|x'_R(k)|^p\right)^{\alpha/p},$$

wherein $$C(p,\alpha)=2^p\frac{\Gamma\left(\frac{p+1}{2}\right)\Gamma\left(1-\frac{p}{\alpha}\right)}{\Gamma\left(\frac{1}{2}\right)\Gamma\left(1-\frac{p}{2}\right)},$$

wherein $-1<p<\alpha$, wherein p can be selected from this interval using a minimum error procedure for a given alpha, and wherein the normalizing term in said codifference correlator is given by $$\hat{\gamma}_{x'}=\hat{\gamma}_{x'_R}+\hat{\gamma}_{x'_I}.$$

11. A correlator according to claim 1:

wherein said codifference correlation is an unnormalized codifference correlation;

wherein said algorithmic means is for calculating the codifference correlation based on estimating the codifference based on the equation $$\hat{q}_{x',y'}=(\hat{\tau}_{x'_R,-y'_R}-\hat{\tau}_{x'_R,y'_R}+\hat{\tau}_{x'_I,-y'_I}-\hat{\tau}_{x'_I,y'_I})+i(\hat{\tau}_{x'_R,-y'_I}-\hat{\tau}_{x'_R,y'_I}-(\hat{\tau}_{x'_I,-y'_R}-\hat{\tau}_{x'_I,y'_R}));$$

wherein $$x'=x'_R+ix'_I$$

$$y'=y'_R+iy'_I;$$

wherein x' represents one of said reference signal and said sampled signal; and wherein y' represents the other of said reference signal and said sampled signal.

12. A correlation detection system for use in association with a modulated signal such as produced by an antenna receiving electromagnetic waves such as radio frequency waves, said correlation detection system comprising:

a down converter adaptable to down converting said modulated signal and producing a down converted signal;

a sampler adaptable to sampling said down converted signal and producing a sampled signal;

a memory adaptable to storing a reference signal; and a correlator adaptable to correlating said reference signal and said sampled signal, said correlator including processor means and being capable of estimating the codifference correlation between said reference signal and said sampled signal based on the sum and difference of codifference estimates, each said codifference estimate being equated with a corresponding dispersion estimate.

13. A correlation detection system as recited in claim 12, wherein said correlator is capable of producing a correlation signal indicative of said codifference correlation, and further comprising a detector adaptable to detecting said correlation signal.

14. A correlation detection system as recited in claim 13, wherein said detector is adaptable to producing a detected signal, and further comprising a sound transducer adaptable to converting said detected signal to an audible signal.

15. A correlation detection system as recited in claim 14, wherein said sound transducer includes at least one device selected from the group consisting of speaker and phone.

16. A correlation detection system as recited in claim 12:

wherein said codifference correlation is normalized and is estimated from the equation $$\hat{h}=[(\hat{\tau}_{x'_R,-y'_R}-\hat{\tau}_{x'_R,y'_R}+\hat{\tau}_{x'_I,-y'_I}-\hat{\tau}_{x'_I,y'_I})+$$
$$i(\hat{\tau}_{x'_R,-y'_I}-\hat{\tau}_{x'_R,y'_I}-(\hat{\tau}_{x'_I,-y'_R}-\hat{\tau}_{x'_I,y'_R}))]/(2^\alpha \hat{\gamma}_{x'});$$

wherein x' represents one of said reference signal and said sampled signal; and wherein y' represents the other of said reference signal and said sampled signal.

17. A correlation detection system as recited in claim 12: wherein said codifference correlation is unnormalized and is estimated from the equation $$\hat{q}_{x',y'}=(\hat{\tau}_{x'_R,-y'_R}-\hat{\tau}_{x'_R,y'_R}+\hat{\tau}_{x'_I,-y'_I}-\hat{\tau}_{x'_I,y'_I})+$$
$$i(\hat{\tau}_{x'_R,-y'_I}-\hat{\tau}_{x'_R,y'_I}-(\hat{\tau}_{x'_I,-y'_R}-\hat{\tau}_{x'_I,y'_R}));$$

wherein $$x'=x'_R+ix'_I$$
$$y'=y'_R+iy'_I;$$

wherein x' represents one of said reference signal and said sampled signal; and wherein y' represents the other of said reference signal and said sampled signal.

18. A method for producing an output signal which is indicative of a correlation of at least two input signals, said method comprising:

estimating the codifference correlation with respect to said at least two input signals, said estimating including considering the sum and difference of codifference estimates wherein each said codifference estimate is equated with a corresponding dispersion estimate; and producing an output signal commensurate with said codifference correlation.

19. A method for producing an output signal as defined in claim 18: wherein said codifference correlation is normalized and is estimated from the equation $$\hat{h}=[(\hat{\tau}_{x'_R,-y'_R}-\hat{\tau}_{x'_R,y'_R}+\hat{\tau}_{x'_I,-y'_I}-\hat{\tau}_{x'_I,y'_I})+$$
$$i(\hat{\tau}_{x'_R,-y'_I}-\hat{\tau}_{x'_R,y'_I}-(\hat{\tau}_{x'_I,-y'_R}-\hat{\tau}_{x'_I,y'_R}))]/(2^\alpha \hat{\gamma}_{x'});$$

wherein x' represents a first said signal; and wherein y' represents a second said signal.

20. A method for producing an output signal as defined in claim 18: wherein said codifference correlation is unnormalized and is estimated from the equation $$\hat{q}_{x',y'}=(\hat{\tau}_{x'_R,-y'_R}-\hat{\tau}_{x'_R,y'_R}+\hat{\tau}_{x'_I,-y'_I}-\hat{\tau}_{x'_I,y'_I})+$$
$$i(\hat{\tau}_{x'_R,-y'_I}-\hat{\tau}_{x'_R,y'_I}-(\hat{\tau}_{x'_I,-y'_R}-\hat{\tau}_{x'_I,y'_R}));$$

wherein $$x'=x'_R+ix'_I$$
$$y'=y'_R+iy'_I;$$

wherein x' represents a first said signal; and wherein y' represents a second said signal.

21. In a communication system of the type including antenna means for receiving electromagnetic waves and filtering means for filtering associated electromagnetic signals via a plurality of channels, a correlator for correlating at least one pair of said filtered signals transmitted via separate said channels, said correlator comprising algorithmic means for calculating the codifference correlation between a least one pair of said filtered signals based on the sum and difference of codifference estimates, wherein each said codifference estimate is equated with a corresponding dispersion estimate.

22. A correlator according to claim 21:

wherein said codifference correlation is normalized and is estimated from the equation $$\hat{h}=[(\hat{\tau}_{x'_R,-y'_R}-\hat{\tau}_{x'_R,y'_R}+\hat{\tau}_{x'_I,-y'_I}-\hat{\tau}_{x'_I,y'_I})+$$
$$i(\hat{\tau}_{x'_R,-y'_I}-\hat{\tau}_{x'_R,y'_I}-(\hat{\tau}_{x'_I,-y'_R}-\hat{\tau}_{x'_I,y'_R}))]/(2^\alpha \hat{\gamma}_{x'});$$

wherein x' represents a first said filtered signal of said pair of filtered signals; and wherein y' represents a second said filtered signal of said pair of filtered signals.

23. A correlator according to claim 21:

wherein said codifference correlation is unnormalized and is estimated from the equation $$\hat{q}_{x',y'}=(\hat{\tau}_{x'_R,-y'_R}-\hat{\tau}_{x'_R,y'_R}+\hat{\tau}_{x'_I,-y'_I}-\hat{\tau}_{x'_I,y'_I})+$$
$$i(\hat{\tau}_{x'_R,-y'_I}-\hat{\tau}_{x'_R,y'_I}-(\hat{\tau}_{x'_I,-y'_R}-\hat{\tau}_{x'_I,y'_R}));$$

wherein $$x'=x'_R+ix'_I$$
$$y'=y'_R+iy'_I;$$

wherein x' represents a first said filtered signal of said pair of filtered signals; and wherein y' represents a second said filtered signal of said pair of filtered signals.

* * * * *